United States Patent
Reyna Fernandez et al.

(10) Patent No.: US 12,373,640 B2
(45) Date of Patent: Jul. 29, 2025

(54) REAL-TIME ARTIFICIAL INTELLIGENCE POWERED DYNAMIC SELECTION OF TEMPLATE SECTIONS FOR ADAPTIVE CONTENT CREATION

(71) Applicant: Microsoft Technology Licensing, LLC, Redmond, WA (US)

(72) Inventors: Ricardo Reyna Fernandez, Boston, MA (US); Jenna Hong, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 18/362,398

(22) Filed: Jul. 31, 2023

(65) Prior Publication Data
US 2025/0045516 A1 Feb. 6, 2025

(51) Int. Cl.
*G06F 40/186* (2020.01)
*G06F 16/3329* (2025.01)

(52) U.S. Cl.
CPC ........ *G06F 40/186* (2020.01); *G06F 16/3329* (2019.01)

(58) Field of Classification Search
CPC ............. G06F 3/048–05; G06F 40/186; G06F 16/3329–33295
See application file for complete search history.

(56) References Cited

U.S. PATENT DOCUMENTS

2018/0150446 A1* 5/2018 Sivaji .................... G06F 16/958
2018/0240538 A1* 8/2018 Koll ....................... G16H 10/60
2018/0267950 A1* 9/2018 de Mello Brandao . G06F 40/30
2020/0117752 A1* 4/2020 Liu ...................... G06F 16/3344
2022/0004705 A1* 1/2022 Chua ...................... G06N 20/00
(Continued)

FOREIGN PATENT DOCUMENTS

CN 112711937 A * 4/2021 ........... G06F 40/186

OTHER PUBLICATIONS

English Translation of CN 112711937 A published on Apr. 27, 2021 (Year: 2021).*

(Continued)

*Primary Examiner* — Daniel Rodriguez
(74) *Attorney, Agent, or Firm* — NovoTechIP International PLLC

(57) ABSTRACT

A data processing system implements and iterative process for dynamically creating a template including receiving a request for a template suggestion for an electronic content item for an application on a client device. The request includes an identifier of the application and textual content from the first electronic content item. The system further implements providing the identifier of the first application and the textual content to a language model to obtain a template suggestion, the language model being trained to analyze the identifier of the application and the textual content and to output the template suggestion, the template suggestion comprising a template identifier and a first subsection identifier identifying a first subsection of the first template predicted to be relevant to the user for creating the electronic content item, sending the template suggestion to the client device, and causing the client device to present the template suggestion in the application.

20 Claims, 15 Drawing Sheets

(56) References Cited

U.S. PATENT DOCUMENTS

2022/0414323 A1\* 12/2022 Sreenivasan .......... G06F 40/186
2023/0004727 A1    1/2023 Oberoi et al.

OTHER PUBLICATIONS

International Search Report and Written Opinion received for PCT Application No. PCT/US2024/036464, mailed on Oct. 15, 2024, 13 pages.

\* cited by examiner

REAL-TIME ARTIFICIAL INTELLIGENCE POWERED DYNAMIC SELECTION OF TEMPLATE SECTIONS FOR ADAPTIVE CONTENT CREATION

BACKGROUND

Many applications provide users with the ability to select from among a set of predetermined templates that can assist the user in creating new electronic content. This content can include but it not limited to word processing documents, spreadsheets, presentations, web pages, and/or other types of electronic content. Choosing an appropriate template from among the available set of predetermined templates can be overwhelming for a number of reasons. All sections of predetermined templates are added to the electronic content all at once and the templates often provide guidance for creating content for a variety of use cases that are not applicable to the user. When presented with such an extensive and comprehensive template, the user may find it challenging to understand the overall framework of the template and to determine how to apply the template for their particular use case. Consequently, the user may either abandon the template or expend a significant amount of time and effort to adapt the template to suit their needs. Furthermore, the user may find that sections from different template are useful, but current applications do not provide means for the user to combine subsections from multiple templates. Hence, there is a need for improved systems and methods that provide a technical solution for suggesting and adapting templates for creating electronic content.

SUMMARY

An example data processing system according to the disclosure includes a processor and a machine-readable medium storing executable instructions. The instructions when executed cause the processor alone or in combination with other processors to perform operations including receiving a first request for a template suggestion for a first electronic content item for a first application on a first client device, the first request including an identifier of the first application and first textual content from the first electronic content item, the first textual content representing at least a first subsection of the first electronic content item; constructing a first prompt for a first language model, the first prompt comprising a first natural language query that includes the identifier of the first application and the first textual content representing at least the first subsection of the first electronic content; providing the first prompt to the first language model to obtain a first template suggestion, the first template suggestion comprising one or more template subsections selected from among a plurality of templates predicted to be relevant for creating the first electronic content item based on the first application identifier and the first textual content, the first language model being trained on the plurality of document templates; sending the first template suggestion to the first client device; causing the first client device to present the first template suggestion in the first application on the first client device; receiving a second request for a template suggestion for the first electronic content item, the second request including the identifier of the first application and second textual content from the first electronic content item, the second textual content being different than the first textual content, the second textual content representing at least a second subsection of the first electronic content item; constructing a second prompt for the first language model, the second prompt comprising a second natural language query that includes the identifier of the first application and the second textual content representing the at least the second subsection of the first electronic content; providing the second prompt to the first language model to obtain a second template suggestion, the second template suggestion comprising one or more second template subsections selected from among a plurality of second templates predicted to be relevant for creating the first electronic content item based on the first application identifier and the second textual content; sending the second template suggestion to the first client device; and causing the first client device to present the second template suggestion in the first application on the first client device.

An example method implemented in a data processing system includes receiving a first request for a template suggestion for a first electronic content item for a first application on a first client device, the first request including an identifier of the first application and first textual content from the first electronic content item, the first textual content representing at least a first subsection of the first electronic content item; constructing a first prompt for a first language model, the first prompt comprising a first natural language query that includes the identifier of the first application and the first textual content representing at least the first subsection of the first electronic content; providing the first prompt to the first language model to obtain a first template suggestion, the first template suggestion comprising a first template identifier of a first template and a first subsection of the first template predicted to be relevant for creating the first electronic content item based on the first application identifier and the first textual content, the first template being selected from among a plurality of templates and the first subsection of the first template being selected from among a plurality of subsections of the first template, the first language model being trained on the plurality of document templates; sending the first template suggestion to the first client device; causing the first client device to present the first template suggestion in the first application on the first client device; receiving a second request for a template suggestion for the first electronic content item, the second request including the identifier of the first application and second textual content from the first electronic content item, the second textual content being different than the first textual content, the second textual content representing at least a second subsection of the first electronic content item; constructing a second prompt for the first language model, the second prompt comprising a second natural language query that includes the identifier of the first application and the second textual content representing the at least the second subsection of the first electronic content; providing the second prompt to the first language model to obtain a second template suggestion, the second template suggestion comprising a second template identifier of a second template and a first subsection of the second template predicted to be relevant for creating the first electronic content item based on the first application identifier and the second textual content, the second template being selected from among the plurality of templates and the first subsection of the second template being selected from among a plurality of subsections of the second template; sending the second template suggestion to the first client device; causing the first client device to present the second template suggestion in the first application on the first client device.

An example data processing system according to the disclosure includes a processor and a machine-readable medium storing executable instructions. The instructions when executed cause the processor alone or in combination with other processors to perform operations including accessing a plurality of templates for creating electronic content items; categorizing each of the templates based at least in part on textual content of the templates, metadata associated with each of the templates, or a combination thereof; segmenting the plurality of templates to segment each template into a plurality of subsections using a segmentation model trained to segment templates into the plurality of subsections based on a type of content included in each of the subsections; generating metadata for each template of the plurality of templates and the subsections associated with each template, the metadata including an indication of an application associated with the template, a category of subject matter associated with each of the templates, and a type of content included in each of the subsections of the template; storing each of the templates, the plurality of subsections associated with each of the templates, and the metadata associated with each of the templates in a template datastore in a memory of the data processing system; generating training data for a language model based on the metadata stored in the template datastore; training the language model using the training data; and dynamically generating a template for an electronic content item based on template suggestions obtained from the language model as the electronic content item is being created in a first application, the template comprising a plurality of template subsections predicted to be relevant for creating the electronic content item, wherein the template subsections are presented on a user interface of the first application in which the electronic content item is being created as the electronic content item is being created.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
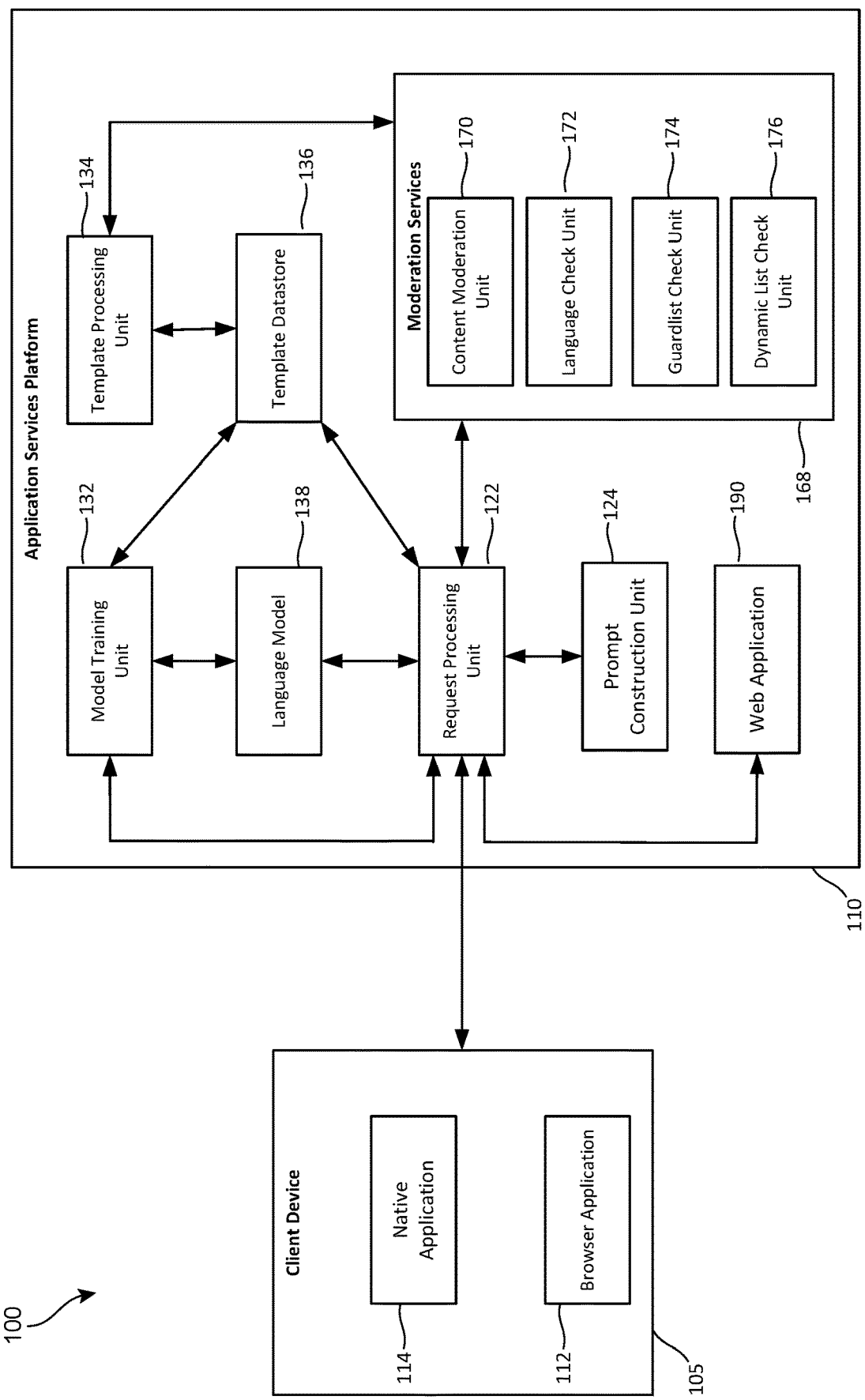
FIG. 1 is a diagram of an example computing environment in which the dynamic template selection techniques described herein may be implemented.

Systems and methods for providing real-time artificial intelligence (AI) powered selection of template sections for adaptive content creation are described herein. A template is a collection of content with a distinct look and feel based on the consistency of the content. Current templates are static and provided to users from a preexisting set of static templates. Consequently, the user choice is limited, and the templates are typically designed to cover specific use cases that do not align with the specific needs of a user creating content.

These systems and methods address the technical problems associated with current template solutions for applications, which include lack of flexibility and excessive complexity of the predetermined templates provided by current template software. The systems and methods herein address the lack of flexibility and excessive complexity of current solutions by providing an AI-driven solution that analyzes electronic content items being created by a user to automatically determine an appropriate category of template to recommend to the user. Furthermore, this AI-driven solution reduces the complexity of the templates offered to the user by automatically subdividing templates into multiple subsections. This flexible approach selects only those subsections of the templates that are predicted to be relevant and presents those to the user in an order that is predicted to be most relevant in the context of the electronic content item being created. The techniques herein utilize a language model trained to analyze textual content from an electronic content item being created or modified and to suggest relevant template subsections from one or more templates.

A technical benefit of this approach is that the subsections from multiple templates are considered when making recommendations to the user. The user may be presented with subsections from multiple different templates rather than being limited to a single static template recommendation as in current systems. Consequently, the user experience and workflow may be significantly improved because the user does not have to waste time and computing resources to identify a relevant template and/or subsections thereof that is relevant for the content item that they are creating.

Another technical benefit of the techniques herein is that the complexity of the user interface associated with an application that utilizes the template is reduced. In current applications that utilize templates, the user often has to navigate through multiple menu items and/or screens to browse through the available templates to determine whether any of the predetermined static templates will satisfy their requirements for creating and/or modifying an electronic content item. The techniques herein reduce this complexity by analyzing the textual content of the electronic content item being created and automatically suggesting template subsections from one or more templates that are predicted to be relevant to the electronic content item being created. Another technical benefit of this approach is that these computing resources associated with utilizing the templates may be significantly reduces by eliminating the need for users to browse through an extensive selection of templates and to modify the templates to suit their particular need. These and other technical benefits of the techniques disclosed herein will be evident from the discussion of the example implementations that follow.

FIG. 1 is a diagram of an example computing environment in which the techniques herein may be implemented. The example computing environment includes a client device 105 and an application services platform 110. The application services platform 110 provides one or more cloud-based applications and/or provides services to support one or more web-enabled native applications on the client device 105. These applications may include but are not limited to presentation applications, word processing applications, web site authoring applications, collaboration platforms, communications platforms, and/or other types of applications in which users may create, view, and/or modify various types of electronic content. In the implementation shown in FIG. 1, the application services platform 110 also identifies and suggests templates and/or template subsections to users according to the AI-powered selection of template sections for adaptive content creation described herein. The client device 105 and the application services platform 110 communicate with each other over a network (not shown). The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize service provided by the application services platform 110.

The client device 105 includes a native application 114 and a browser application 112. The native application 114 is a web-enabled native application, in some implementations, that enables users to view, create, and/or modify electronic content. The web-enabled native application utilizes services provided by the application services platform 110 including but not limited to creating, viewing, and/or modifying various types of electronic content and obtaining templates for creating and/or modifying the electronic content. The native application implements the user interface 205 shown in FIGS. 2A-2E in some implementations. In other implementations, the browser application 112 is used for accessing and viewing web-based content provided by the application services platform 110. In such implementations, the application services platform 110 implements one or more web applications, such as the web application 190, that enables users to view, create, and/or modify electronic content and to obtain template recommendations for creating and/or modifying the electronic content. The web application implements the user interface 205 shown in FIGS. 2A-2E in some implementations. The application services platform 110 supports both web-enabled native applications and a web application in some implementations, and the users may choose which approach best suits their needs.

The application services platform 110 includes a request processing unit 122, a prompt construction unit 124, the web application 190, a language model 138, a model training unit 132, a template processing unit 134, a template datastore 136, and moderation services 168.

The request processing unit 122 is configured to receive requests from the native application 114 of the client device 105 and/or the web application 190 of the application services platform 110. The requests may include but are not limited to requests to create, view, and/or modify various types of electronic content and/or obtaining templates for creating and/or modifying the electronic content. The request processing unit 122 also coordinates communication and exchange of data among components of the application services platform 110 as discussed in the examples which follow.

The language model 138 is a machine learning model trained to generate recommendations for a template and/or template subsection that can be presented to a user of the client device 104 via the native application 114 or via the browser application 112. The language model 138 is implemented using a large language model (LLM) in some implementations. Examples of such models include but not limited to a Generative Pre-trained Transformer 3 (GPT-3), or GPT-4 model. Other implementations may utilize other models or other generative models to generate the recommendations.

The request processing unit 122 receives a request for a template suggestion from the native application 114 or the web application 190. The template suggestion may include information identifying one or more templates and one or more template subsections from one or multiple templates. The request includes an indication identifying the application for which the template is being requested and textual content from an electronic content item for which the template is being requested. The textual content may include a title and/or headers extracted from the electronic content item, a sentence or sentences of text from the electronic content item, a paragraph or paragraphs from the electronic content item, a section or sections of the electronic content item, and/or other portion of the text from the electronic content item. In some implementations, other information, such as a position of a cursor or other indication of the portion of the electronic content item being worked on is included in the request received by the request processing unit 122 and is provided to the prompt construction unit 124 to provide the language model 138 with information indicative of the portion of the electronic content item on which the user is currently working. This information can be used, in part, by the language model 138 to determine an appropriate subsection of a template to be recommended to the user. In a non-limiting example, a first subsection of a template may be relevant, if the user is working on a content of a first type within the electronic content item while a second subsection of a template may be more relevant, if the user is working on a content of a second type within the electronic content item. The prompt construction unit 124 may also include additional contextual information about the user in some implementations. The prompt construction unit 124 may reformat or otherwise standardize the information to be included in the prompt to a standardized format that is recognized by the language model 138. The language model 138 is trained using training data in this standardized format, in some implementations, and utilizing this format for the prompts provided to the language model 138 may improve the predictions provided by the language model 138.

The prompt construction unit 124 constructs a textual prompt for the language model 138 based on information extracted from requests received by the request processing unit 122. The request processing unit 122 may receive requests for template suggestions via the native application 114 or the web application 190. These requests may include an indication of an application for which a template suggestion is being requested, at least a portion of the textual content from a content item being created or modified in the application, metadata associated with the content item being created or modified, contextual information associated with the user creating or modifying the content, and/or other information that may be used by the language model 138 to predict one or more template subsections from one or more templates that would be relevant for assisting in the creation of the electronic content item. The one or more templates are selected from among multiple templates in the template datastore 136, and one or more template subsections are selected from among the templates that have been selected. Consequently, as a template is dynamically constructed to assist the user in creating an electronic content item, the template subsections may be selected from multiple templates from the template datastore 136 that have been determined to be relevant. Furthermore, where multiple subsections are selected from a single template, the order in which the subsections are selected and utilized may be different than the order that these subsections appear in the original template. In some implementations, where multiple template subsections are selected from among the relevant templates, the native application 114 and/or the web application 190 present the multiple template subsections to the user. The user may select from among the template subsections or decide not to utilize any of the template subsections that have been presented.

In some implementations, the prompt construction unit 124 constructs a natural language query that is provided to as a prompt to the language model 138. In such implementations, the prompt construction unit 124 includes at least an application identifier and at least a subsection of the textual content of the electronic content item. The textual content may include but is not limited to a file title, section header or subtitles, and/or other textual content that has been added to the electronic content item. This textual content provides context to the language model 138 to determine which categories of template and which types of template subsections may be relevant to the user. The generation of the template suggestions is an iterative process that continues as the user creates or modifies the electronic content items. This approach enables the system to dynamically construct a custom template from among the available templates and template subsections.

In a nonlimiting example, the prompt construction unit 124 constructs a natural language query having the following format: "what template could I use in application X for Y" where X represents a name or other application identifier associated with the application for which the template is to be created and Y represents at least a portion of the textual content from the electronic content item being created. Other implementations may also include additional information in the prompt, such as but not limited to an identifier of the user for whom the template is being suggested, metadata associated with the electronic content item, or a combination thereof. In some implementations, the prompt construction unit 124 has access to user context information, such as information indicative of how the user has utilized templates in the past and which templates the user utilized, the type of content that the user typically creates, and/or such information that may be included in the prompt to further refine the predictions that a particular template subsection would be relevant to the user.

The prompt construction unit 124 provides the prompt to the request processing unit 122 for processing. The request processing unit 122 then provides the prompt to the language model 138 as an input. The language model 138 analyzes the prompt and outputs a template suggestion. The template suggestion includes at least one template identifier that identifies a template from the template datastore 136 that the language model 138 has predicted to be relevant for assisting in the creation of an electronic content item. The template suggestion includes more than one template identifier in instances in which the language model 138 determines that more than one template is relevant based on the prompt. The template suggestion includes at least one subsection of each of the templates included in the template suggestions. A template may include multiple subsections, and more one or more of these subsections of the templates determined to be relevant may be determined to be relevant. Presenting the entire template to the user at once can be overwhelming. Furthermore, some of the subsections may not be relevant to the electronic content item being created or modified and/or the order in which the subsections appear in the original static template may not be in an appropriate for a particular use case. To address these shortcomings of current templates, the request processing unit 122 accesses just the relevant subsection of the template from the template datastore 136 and provides the relevant subsection of the template to the native application 114 or the web application 190 to be presented to the user. The user is less likely to be overwhelmed by a complex template because the template is presented to the user one subsection at a time. Furthermore, this approach allows the application services platform 110 to provide suggestions for template subsections from more than one template in instances in which the language model 138 determines that template subsections from multiple templates are relevant. The request processing unit 122 providing the relevant subsection or subsections of the template or templates to the native application 114 or the web application 190 causes the template to be presented on a display of the client device 105.

The prompt construction unit 124 is provided other contextual information in addition to the items discussed above, in some implementations. This context information can include but is not limited to information indicating the templates and/or subsections of templates that the user has previously selected and/or information indicating the templates and/or subsections of the templates that other users have previously selected. The language model 138 can use this information to provide additional context that can improve the suggestions made to the user by considering the templates and/or subsections of templates that the user or other users have utilized in the past.

Figure 4:
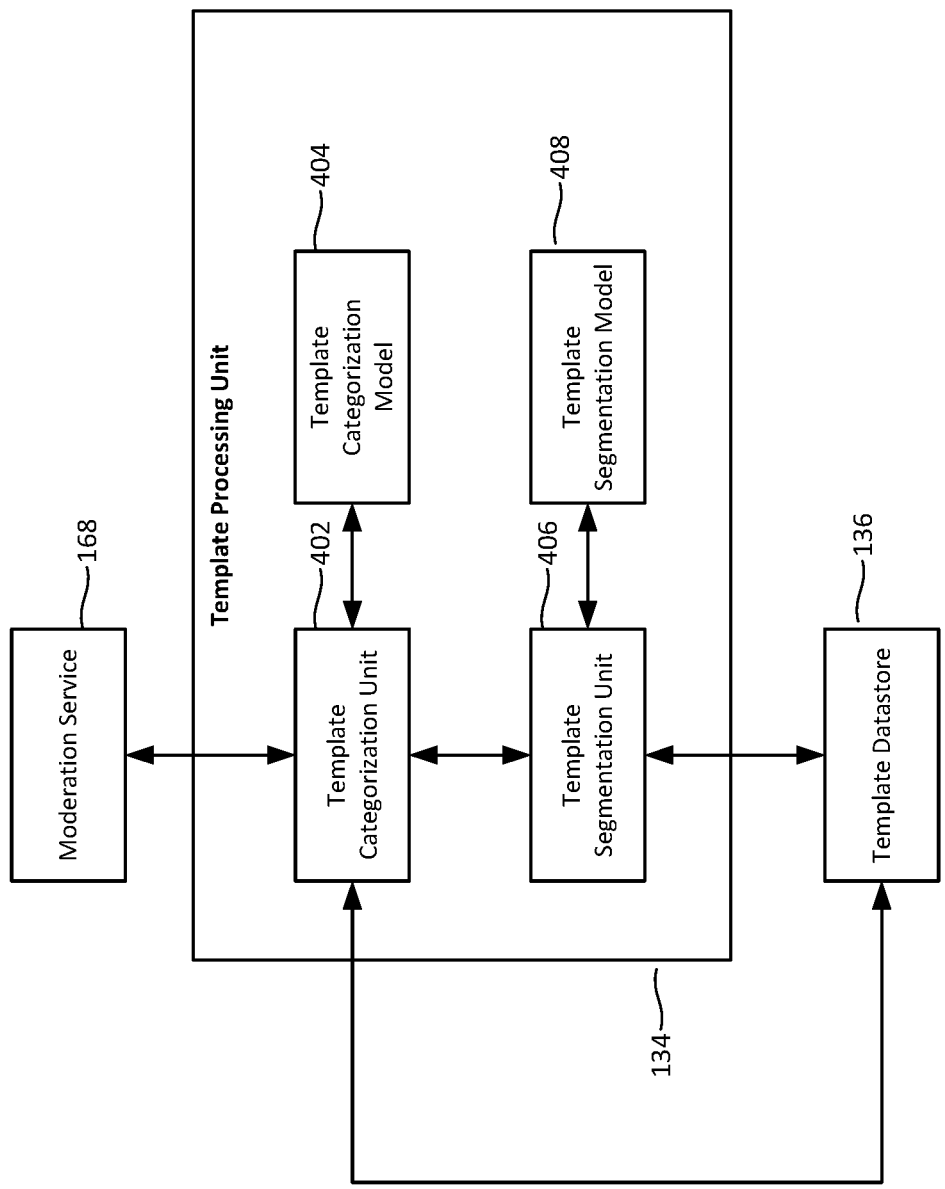
FIG. 4 is a diagram showing additional features of the template processing unit of the application services platform shown in FIG. 1.

The template processing unit 134 analyzes, categorizes, segments, and stores templates in the template datastore 136. The template processing unit 134 is used to add new templates to the application services platform 110. Additional details of the template processing unit 134 are shown in FIG. 4.

Figure 5:
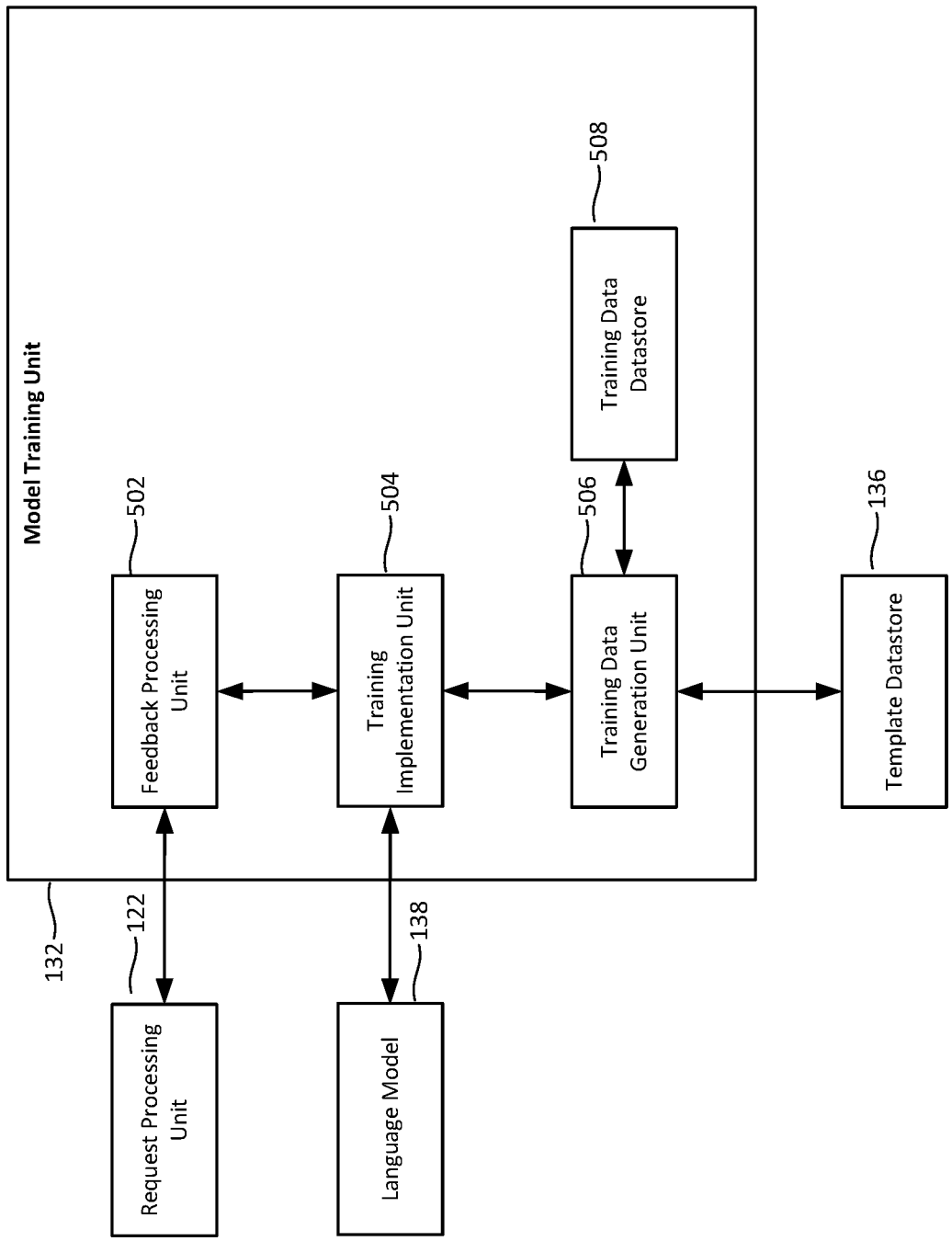
FIG. 5 is a diagram showing additional features of the model training unit of the application services platform shown in FIG. 1.

The model training unit 132 is used to train the language model 138. The model training unit 132 generates training data from the template information included in the template datastore 136 that was generated by the template processing unit 134. The model training unit 132 refines the predictions made by the language model 138 based on user feedback, in some implementations. Additional details of the model training unit 132 are shown in FIG. 5.

The moderation services 168 analyze the textual content obtained from the electronic content item and content generated by the language model 138 to ensure that potentially objectionable or offensive content is not generated or utilized by the application services platform 110. If potentially objectionable or offensive content is detected, the moderation services 168 provides a blocked content notification to the client device 105 indicating that content included in the electronic content item and/or generated by the language model 138 included content that is blocked. The moderation services 168 also prevent such objectionable content from being incorporated into a template that may later be recommended to users of the application services platform 110.

The moderation services 168 performs several types of checks on the electronic content item being accessed or modified by the user and/or generated by the language model 138. The content moderation unit 170 is implemented by a machine learning model trained to analyze the textual inputs to perform a semantic analysis on the content to predict whether the content include potentially offensive language. The language check unit 172 performs another check on the content using a second model configured to analyze the words and/or phrase used in textual content to identify potentially offensive language. The guard list check unit 174 is configured to compare the language used in the content with a list of prohibited terms including known offensive words and/or phrases. The dynamic list check unit 176 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guard list as the guard list is updated. The specific checks performed by the moderation services 168 may vary from implementation to implementation. If one or more of these checks determines that the textual content obtained from the electronic content item and/or the content generated by the language model 138 includes offensive content, the moderation services 168 can notify the application services platform 110 that some action should be taken.

In some implementations, the moderation services 168 generates a blocked content notification, which is provided to the client device 105. The native application 114 or the web application 190 receives the notification and presents a message on a user interface of the application that the request received by the request processing unit 122 could not be processed. The user interface provides information indicating why the blocked content notification was issued in some implementations. The user may attempt to refine the electronic content item to remove the potentially offensive content. If a template is determined to include potentially offensive content, the template may be flagged in the template datastore 136 by the moderation services 168 to prevent the template from being utilized until an administrator reviews the template. A technical benefit of this approach is that the moderation services 168 provides safeguards against both user-created and model-created content to ensure that prohibited offensive or potentially offensive content is not included in a template created by or recommend to a user, nor can a template be used to create or modify a content item that includes potentially offensive content.

FIGS. 2A-2E are diagrams of example user interface 205 of an application that implements the techniques described herein. The example user interface shown in FIGS. 2A-2E is a user interface of a collaboration application, such as but not limited to Microsoft Loop®. However, the techniques herein for providing real-time AI-powered selection of template sections for adaptive content creation are not limited to use in a collaboration application and may be used to provide template suggestions for other types of applications including but limited to presentation applications, word processing applications, web site authoring applications, collaboration platforms, communications platforms, and/or other types of applications in which users create, view, and/or modify various types of electronic content.

Figure 2A:
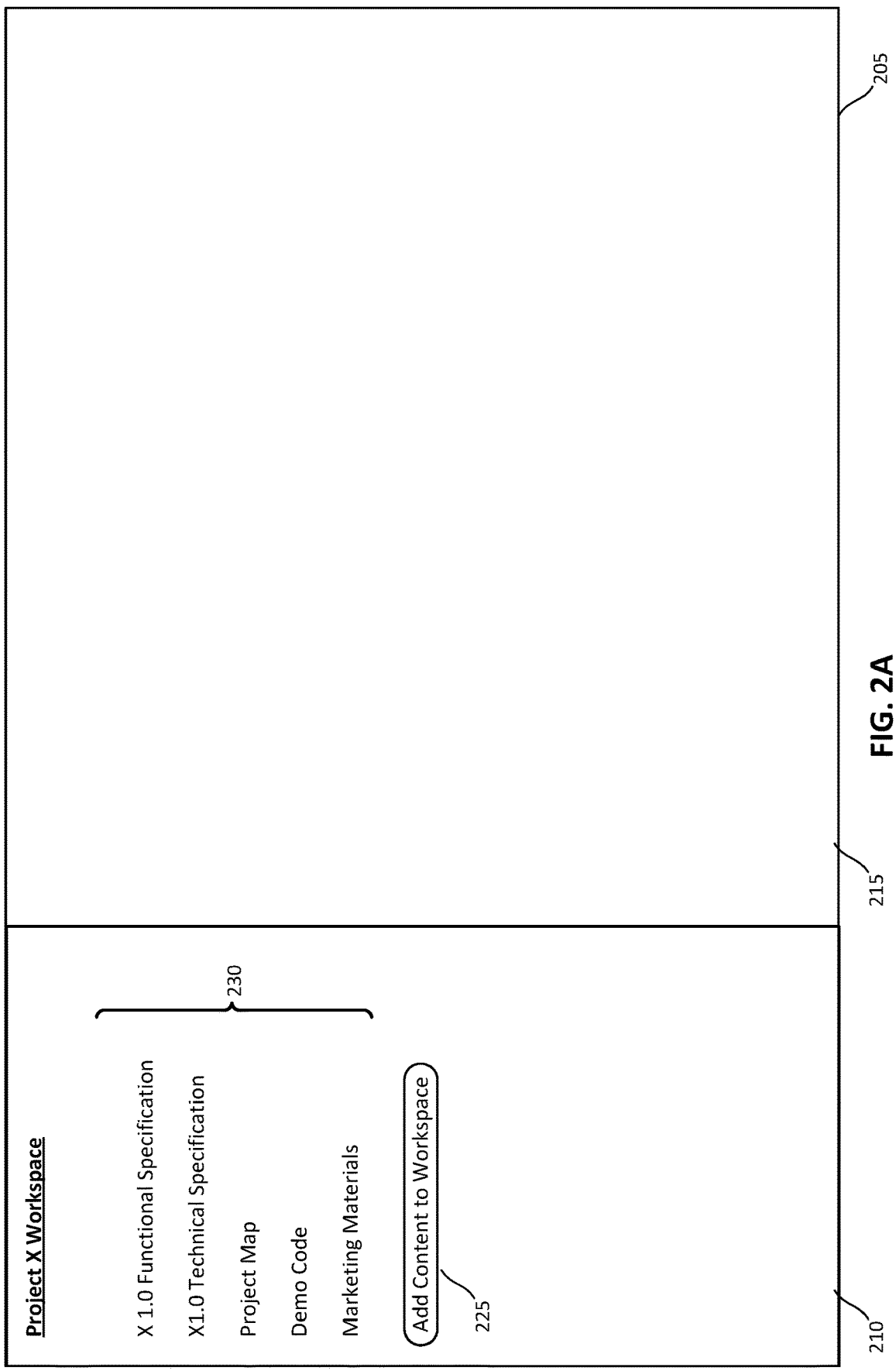
FIGS. 2A-2E are diagrams of example user interfaces of an application that implements the techniques described herein.

FIG. 2A shows an example of the user interface 205 of a collaboration platform in which a workspace has been created. The user interface 205 includes a workspace details pane 210 and a content pane 215. The workspace details pane 210 provides information about the workspace and the electronic content items associated with the workspace. The collaboration platform enables the user to organize electronic content items into project-specific workspaces. The example workspace shown in FIG. 2A includes content items shown in the list of content items 230. The workspace may be a private workspace associated with a single user or a collaborative workspace associated with multiple users. Users may be associated with different access levels or roles that permit the user to perform certain actions associated with the workspace and/or the project collateral, such as but not limited to creating new project collateral, adding existing project collateral to the workspace, accessing existing project collateral, inviting users to collaborate on the workspace, and/or disassociating users with the workspace.

A user may click on or otherwise activate an electronic item from the list of the content items 230 to cause the collateral item to be presented in the content pane 215. In some implementations, the user interface 205 enables the user to view and/or modify the content item. The techniques for providing real-time AI-powered selection of template sections for adaptive content creation provided herein are used to provide template suggestions for creating and/or modifying content items in the user interface 205.

The user interface 205 also include a control 225 for adding content items to the workspace. Clicking on or otherwise activating the control 225 causes the native application 114 or the web application 190 to present a content selection pane that enables the user to browse for and select content items to be added to the workspace. The content items may be stored on the client device 105, on the application services platform 110, or in a network accessible storage location that can be accessed from the client device 105 or the application services platform 110.

Figure 2B:
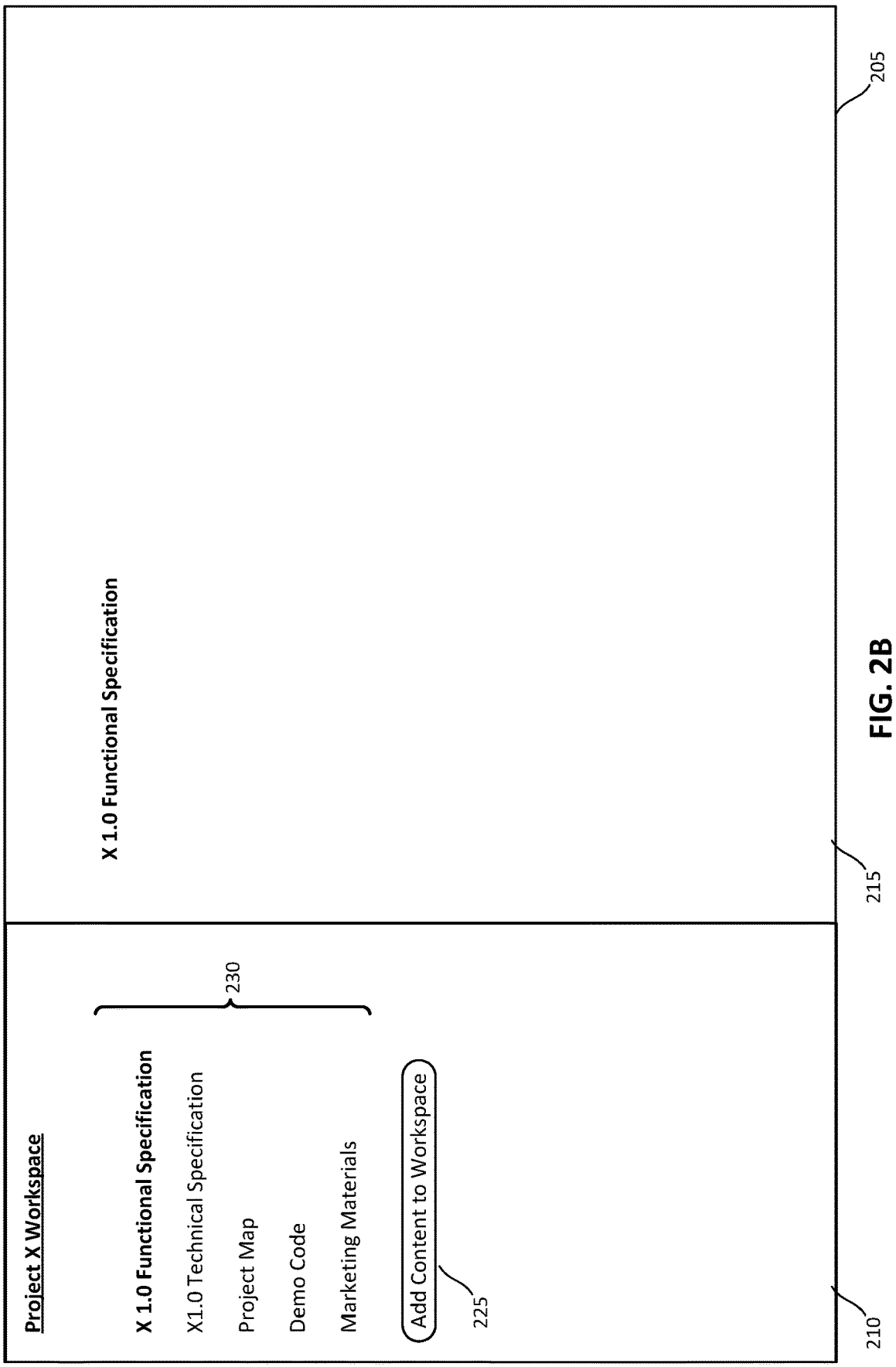

FIG. 2B shows an example of the user interface 205 in which the user is authoring a function specification document in the content pane 215. The user has entered a title for the document but has not yet added any additional information. In some implementations, the native application 114 or the web application 190 automatically analyze textual content from electronic content item presented in the content pane 215 and provide recommendations for template subsections using the techniques provided herein. In other implementations, the content pane 215 includes a control (not shown) which when activated causes the native application 114 or the web application 190 to analyze textual content from the electronic content item presented in the content pane 215 and automatically provide recommendations for template subsections.

Figure 2C:
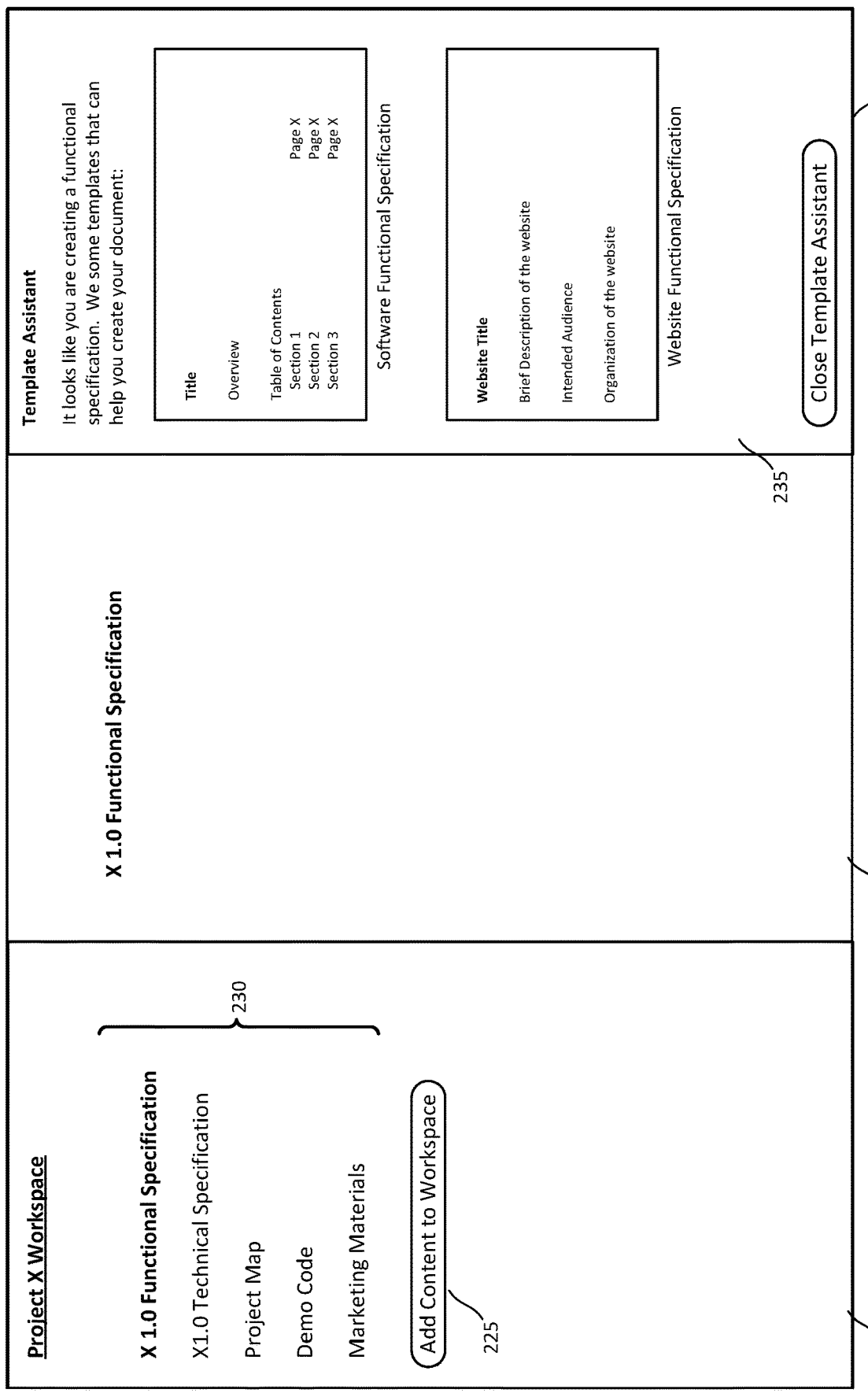

FIG. 2C shows an example of the user interface 205 which includes a template assistant pane 235. In some implementations, the template assistant pane 235 is automatically presented by the native application 114 or the web application 190 in response to the user creating and/or modifying content in the content pane 215. In other implementations, the template assistant pane 235 is presented in response to the user clicking on or otherwise activating a control on the user interface 205 or entering a predetermined keystroke or set of keystrokes.

The template assistant initially presents a set of templates from a category of templates that has been determined to be relevant by the language model 138, in some implementations. In the example implementation shown in FIG. 2C, the category of electronic content being created is a functional specification. The language model 138 may not have enough context to narrow the recommended template to a specific category of template or to narrow the recommendation down to a specific template within a category. In the example shown in FIG. 2C, the language model 138 has found two different templates within the functional specification category: a first template for a software functional specification and a second template for a webpage functional specification. The user can select an appropriate template from the templates presented on the template assistant pane 235 or may instead dismiss the template assistant pane 235 without selecting a template.

Figure 2D:
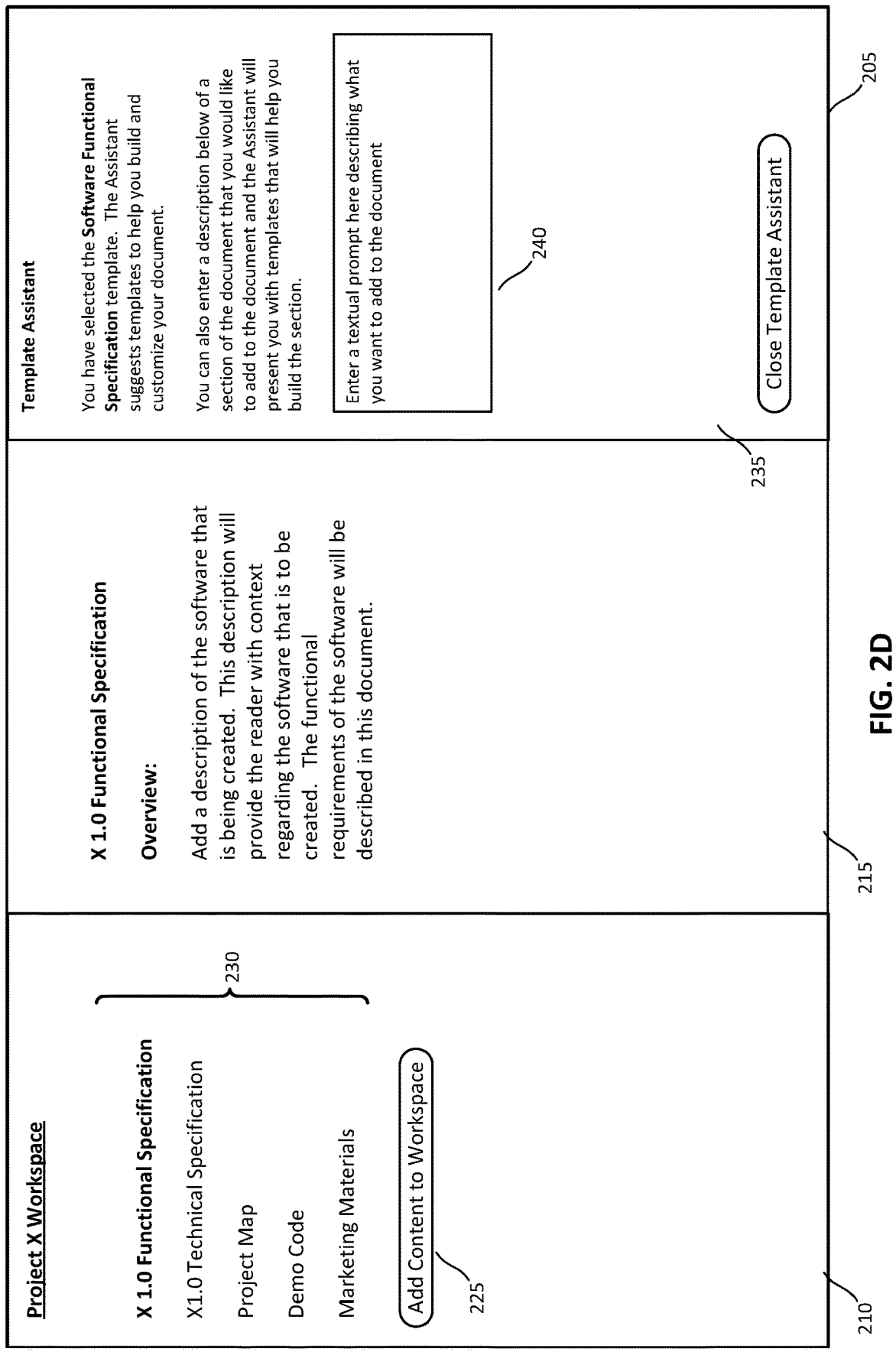

FIG. 2D shows an example of the user interface 205 in which the user has selected the software functional specification template. In response to this selection, the request processing unit 122 provides information to the prompt construction unit 124 to generate a new prompt to the language model 138 that includes the category information for the selected template ("software functional specification" in this example) and an identifier for the selected template, if the user has selected a particular template to be utilized. The language model 138 then suggests a template subsection to present to the user and the template subsection is presented to the user in the content pane 215. In the example shown in FIG. 2D, the language model 138 has suggested a subsection of the template that provides an overview of the functional specification. The user may accept or reject the insertion of the template subsection. In some implementations, the user interface 205 includes an undo control which when activated causes the native application 114 or the web application 190 to remove the suggested template subsection from the electronic content item. The user may accept the insertion of the template subsection by continuing to edit the electronic content item shown in the content pane 215. A technical benefit of this approach is that the user is presented with a subsection of the template that is predicted to be relevant based on the textual content of the electronic content item being created or modified. The language model 138 can suggest the template subsections in a different order than they are included in the template and can also suggest template subsections from multiple different templates.

Figure 2E:
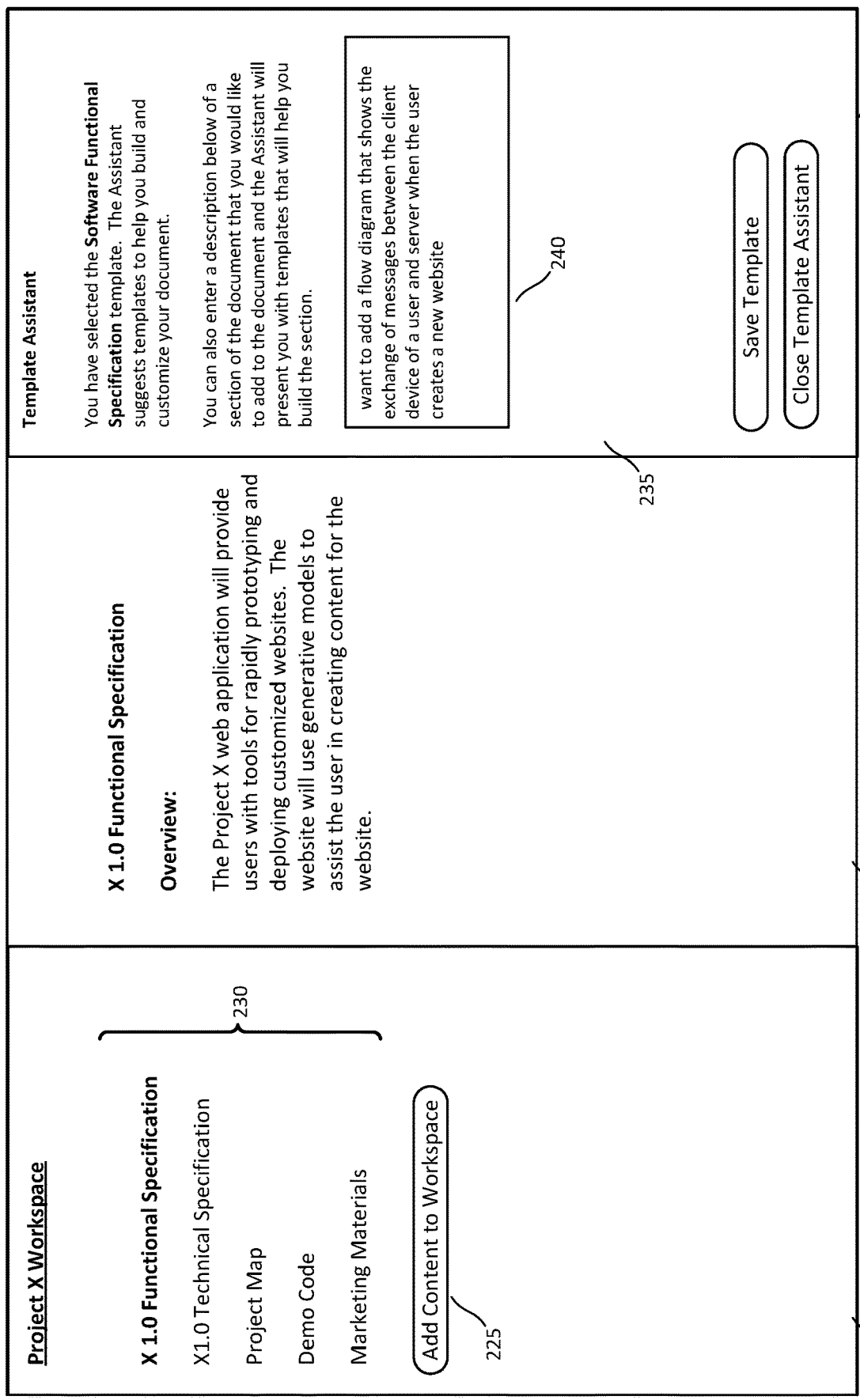

The template assistant pane 235 shown in FIG. 2D includes a chat-based interface that enables the user to provide natural language prompts to the language model 138. The user can provide a natural language feedback to the language model 138 to adjust the recommendations that are being presented to the user. The user may enter a natural language request in the prompt field 240 for a particular type of template subsection be presented to the user. FIG. 2E shows a non-limiting example in which the user has entered a prompt for a flow diagram template subsection to be added. In such implementations, the request processing unit 122 receives the natural language prompt from the client device 105 or the web application 190 and provides the prompt to the prompt construction unit 124 to reformat the prompt into a format expected by the language model 138. The language model 138 generates a template recommendation for a template subsection associated with the category of template being requested. If the language model 138 predicts that there is a relevant template subsection based on the natural language request provided by the user, the request processing unit 122 retrieves the template subsection from the template datastore 136 and provides the template subsection to the native application 114 or the web application 190.

The user can provide a natural language request in the prompt field 240 to refine the recommendation that is provide by the language model 138. The prompt construction unit 124 appends the previous template recommendation to the natural language request to provide the language model 138 with context regarding the previous recommendation provided to the user. The language model 138 can use this information to predict a template subsection to recommend to the user that satisfies the user request. A technical benefit of this approach is that the language model 138 is provided context by including the previous template recommendation in addition to at least a portion of the textual content from the electronic content item in the prompt. Consequently, the language model 138 is more likely to predict a relevant template subsection to recommend to the user.

In some implementations, the user is not required to input a natural language prompt into the prompt field 240. Instead, the prompt construction unit 124 can generate a prompt to be provided to the language model 138 based on content included in the electronic content item that the is creating or modifying in the native application 114 or the web application 190. For example, the prompt construction unit 124 can generate the natural language prompt based on a title of the electronic content item, a subtitle of a section of the electronic content item that the user is authoring or editing, and/or other textual content included in the textual content item. In some such implementations, the template assistant pane 235 omits the prompt field 240, while other implementation still include the prompt field 240, which the user may enter natural language prompts requesting that the template selections be further refined.

In the example implementation shown in FIG. 2E, the template assistant pane 235 also includes a save template option. The save template option enables the user to save a template that includes the template subsections that were dynamically suggested to the user according the techniques described herein. The template includes information identifying the template subsections that were used to create the electronic content item and the order in which these template subsections were utilized to create the electronic content item. The application services platform 110 stores the new template in the template datastore 136. The application services platform 110 may also make copies of the template that were used to create the new template and store those in the template datastore 136 so that the new template is not inadvertently modified if the source templates for one or more of the template subsections is modified. The application services platform 110 provides a user interface for editing the template in some implementations that allows the user to remove or replace any content specific to the electronic content item with content suitable for inclusion in a template. For example, the user may remove descriptive text and/or other content that was specific to the electronic content item with placeholder content. A technical benefit of this approach is that the user can reuse a template that has been dynamically created using the bottom-up template creation techniques. Consequently, the user can reuse the templates that were designed for that user based on their user intent without having to go through the process of creating a new template each time they create a new content item.

Figure 3:
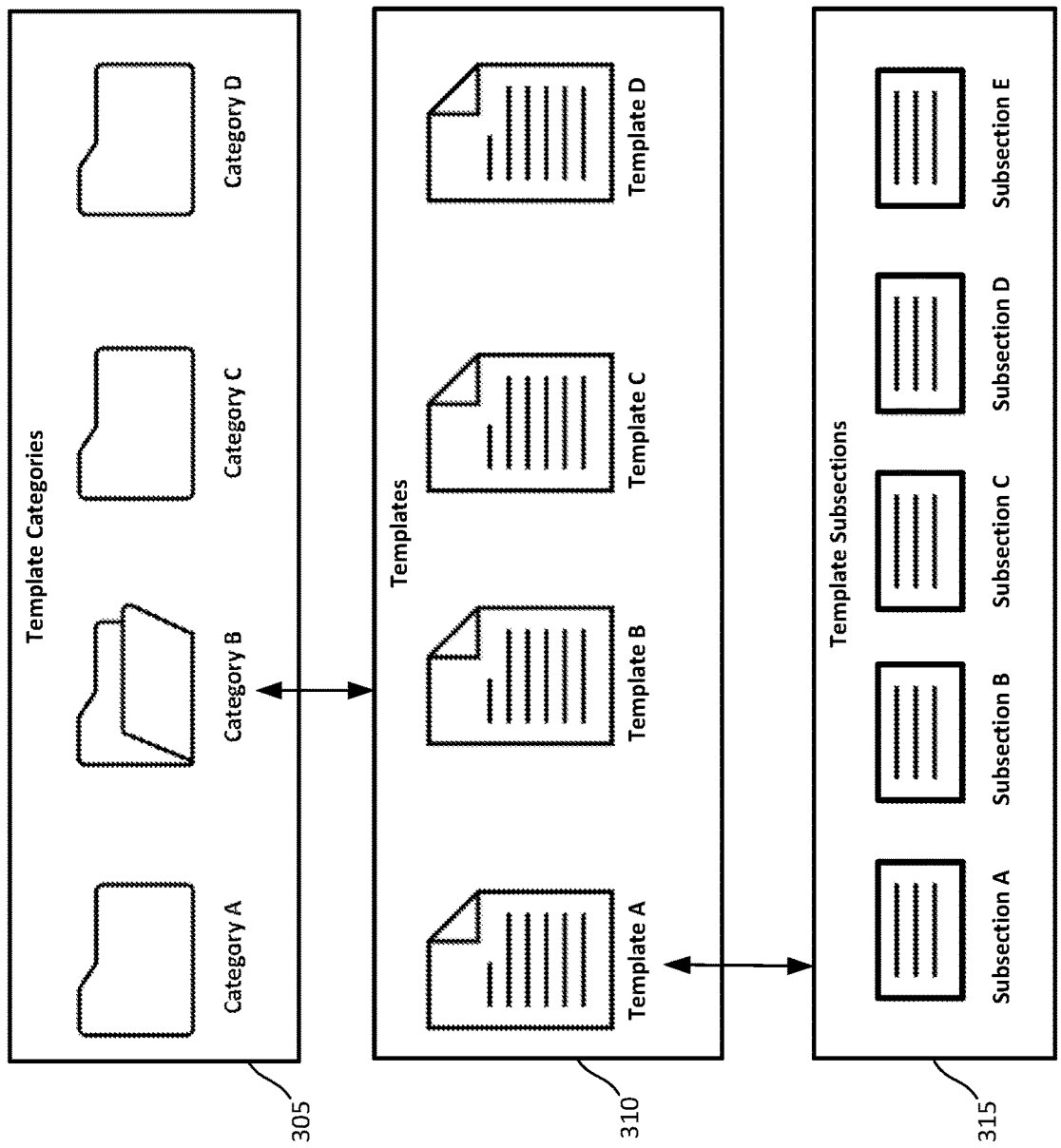
FIG. 3 is a diagram showing an example of a template category and template subsections being suggested according to the techniques described herein.

FIG. 3 is a diagram showing an example of a template category and template subsections being suggested according to the techniques described herein. In the example shown in FIG. 3, there are four template categories 305 shown. However, other implementations may include a different number of template categories. As discussed in the preceding examples, the template categories are associated with a particular application and with a particular subject matter in some implementations. The template processing unit 134 determines the categories for each of the templates included in the template datastore 136. An example implementation of the template processing unit 134 is shown in FIG. 4 and discussed in detail in the examples which follow. Each category may be associated with one or more templates 310. In the example shown in FIG. 3, the category B is associated with four templates, and the template A is associated with five template subsections. The number of categories, the number of templates associated with each category, and the number of subsections associated with each of the templates may vary from implementation to implementation. The language model 138 may provide template recommendations that include subsections of one or more of these templates in response to a request for a template recommendation from the native application 114 or the web application 190.

FIG. 4 is a diagram showing additional features of the template processing unit 134 of the application services platform 110 shown in FIG. 1. The template processing unit 134 analyzes, categorizes, segments, and stores templates in the template datastore 136. The template processing unit 134 is also used to add new templates to the application services platform 110. In some implementations, the templates are developed on behalf of an administrator of the application services platform 110. In other implementations, at least a portion of the templates may be crowdsourced from users of the application services platform 110 who develop the templates for use by themselves and/or other users.

The template processing unit 134 includes a template categorization unit 402, a template categorization model 404, a template segmentation unit 406, and a template segmentation model 408. The template categorization unit 402 checks for templates that have not yet been processed in the template datastore 136. The template categorization unit 402 is scheduled to periodically check for new templates in some implementations. The template processing unit 134 provides a user interface in some implementation that allows a user to add new templates to the template datastore 136, in some implementations, and the template categorization unit 402 automatically analyzes the new templates in response to the templates being added to the template datastore 136.

The template categorization unit 402 is configured to analyze and determine a category for the template. In some implementations, the category is based on the application for which the template is intended and the subject matter of the template. The template categorization unit 402 provides the template to the template categorization model 404, which is trained to analyze the textual content of the template to determine the subject matter of the template. The template categorization model 404 is a language model that is separate from the language model 138. The template categorization model 404 may be implemented by an LLM or other language model. The template categorization unit 402 adds the category information and/or the application information associated with the template to the template datastore 136. The application associated with the template may be specified in the template datastore and is provided by the user submitting the template to the application services platform 110. In other implementations, the template categorization unit 402 determines the application associated with the template based on a file extension associated with the template, metadata associated with the template, and/or other information indicative of the application with which the template is intended to be used. The template categorization unit 402 updates the template datastore to include the application information in such implementations.

The template categorization unit 402 provides the template to the moderation services 168 for analysis. If the moderation services 168 determines that the template includes potentially offensive content, the template categorization unit 402 will halt processing of the template and flag the template for review in the template datastore 136. If an administrator determines that the template does not include potentially offensive content, the administrator can instruct the template processing unit 134 to continue processing the template.

The template categorization unit 402 provides the template to the template segmentation unit 406 to segment the template into subsections. The subsections may be application dependent. For example, a template for a presentation application may be subdivided into separate slides or portions thereof, while a word processing template may be subdivided into subsections based on section headers or other such delimiters.

The template segmentation unit 406 provides the template to the template segmentation model 408 to segment the template into a plurality of subsections. The template segmentation model 408 is separate from the language model 138 in some implementations. The template segmentation model 408 may be implemented by an LLM or other language model. In some implementations, the template segmentation unit 406 provides the template to an application-specific template segmentation model 408 that is trained to segment templates for a specific application. The template categorization model 404 is trained to recognize section headers and other such elements of textual content of the template that denote boundaries of subsections of the template. In some implementations, the templates may include markup tags or other such features that expressly identify the boundaries of a subsection of the template to facilitate segmentation of the template into subsections. The template segmentation unit 406 adds the segments associated with the template to the template datastore 138. In some implementations, the template segmentation model 408 associates a unique identifier with each of the segments that can later be used by the request processing unit 122 to obtain a suggested template subsection from the template datastore 136.

The template processing unit 134 can also include additional information associated with the templates in the template datastore 138. One example of such information is metadata associated with the source template files. The metadata may provide useful information about the contents of the templates and/or the subsections of the templates included therein. The template categorization unit 402 can also use the metadata when categorizing the template to determine an appropriate category for the template. The template segmentation unit 406 may also utilize such metadata to determine the types of section headers or other similar elements that are typically expected to be found in such source templates.

FIG. 5 is a diagram showing additional features of the model training unit 132 of the application services platform 110 shown in FIG. 1. The model training unit 132 is used to train the language model 138. The model training unit 132 generates training data from the template information included in the template datastore 136 that was generated by the template processing unit 134. This approach ensures that the language model 138 is trained to support each of the templates that are available in the template datastore 136. The training data associates each template with a category, an application, and the subsection information. The training data is stored in the training data datastore 508, in some implementations. The training data is used by the training implementation unit 504 to refine the training of the language model 138. The training data may also be based at least in part on metadata associated with the source templates used to generate the training data as discussed with respect to FIG. 4. Furthermore, the training data may include information usage history information for the source templates that indicates how the source templates have been used in the past. This historical usage information may help to improve the prediction made by the language model 138.

The model training unit 132 refines the predictions made by the language model 138 based on user feedback, in some implementations. The user interface 205 may include means for the user to provide feedback on the template suggestions provided by the application services platform 110. The feedback is received by the request processing unit 122 in some implementations and the request processing unit 122 provides the feedback to the feedback processing unit 502. In some implementations, the feedback processing unit 502 generates training data that can be used to refine the training of the language model 138. In other implementations, the feedback processing unit 502 adjusts one or more parameters of the language model 138 using other techniques.

Figure 6A:
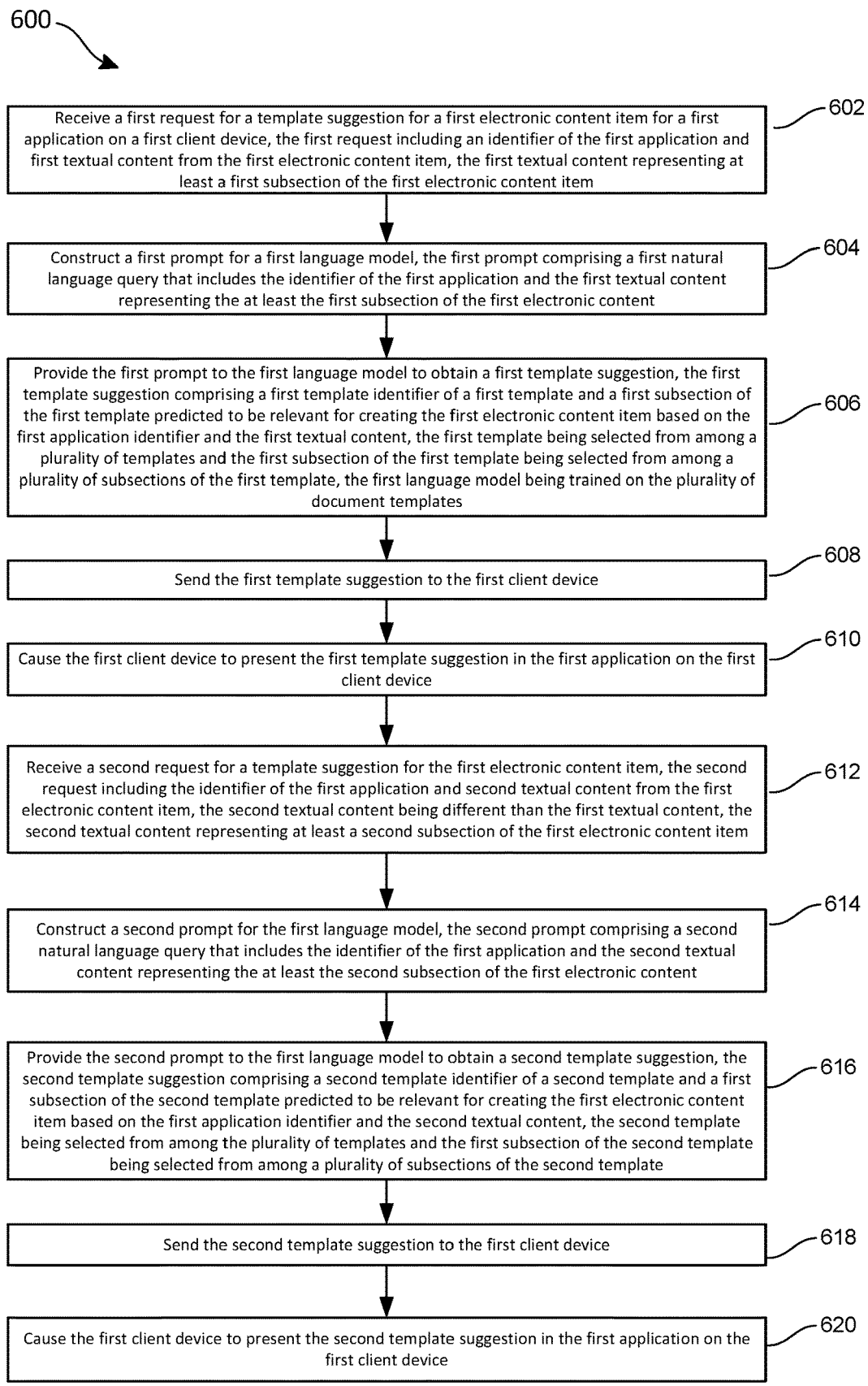
FIG. 6A is a flow chart of an example process for providing template component recommendations in an application according to the techniques disclosed herein.

FIG. 6A is a flow chart of an example process 600 for providing template component recommendations in an application according to the techniques disclosed herein. The process 600 can be implemented by the application services platform 110 shown in the preceding examples. The process 600 utilizes the recommendations of a language model, such as the language model 138, to dynamically construct a template from a plurality of template subsections from one or more existing templates to provide a customized template for the user. Rather than selecting a static, page-level template before any content is added to the electronic content item, the process 600 enables the user to begin authoring the electronic content item and the application services platform 110 uses the language model to predict which template subsections would be useful to the user based on the current textual content of the electronic content item. This approach is an iterative process that creates a custom template that fits the user's needs for a particular electronic content item from the subsection of templates that are selected from among a set of available templates. In some implementations, the user can also choose to save the custom template layout so that the user can select that template again in the future.

The process 600 includes an operation 602 of receiving a first request for a template suggestion for a first electronic content item for a first application on a first client device. The first request includes an identifier of the first application and first textual content from the first electronic content item. The first textual content represents at least a first subsection of the first electronic content item in some implementations. As discussed in the preceding examples, the native application 114 or the web application 190 can request a template suggestion to present to a user creating or modifying an electronic content item. This process can be triggered automatically as the user is creating or modifying an electronic content item or in response to a user input via the user interface of the native application 114 or the web application 190.

The process 600 includes an operation 604 of constructing a first prompt for a first language model. The first prompt comprising a first natural language query that includes the identifier of the first application and the first textual content representing the at least the first subsection of the first electronic content. As discussed in the preceding examples, the prompt construction unit 124 of the application services platform 110 constructs a natural language query that is submitted to the language model.

The process 600 includes an operation 606 of providing the first prompt to the first language model to obtain a first template suggestion. The first template suggestion includes a first template identifier of a first template and a first subsection of the first template predicted to be relevant for creating the first electronic content item based on the first application identifier and the first textual content. The first template is selected from among a plurality of templates and the first subsection of the first template is selected from among a plurality of subsections of the first template. The first language model is trained on the plurality of document templates. The first language model may be implemented by the language model 138 discussed in the preceding examples. The template suggestion output by the model includes information identifying a template and subsection of that template from among the templates stored in the template datastore 126. This enables the request processing unit 122 to obtain the template subsection that has been predicted to be relevant and to provide that template subsection to the native application 114 or the web application 190.

The process 600 includes an operation 608 of sending the first template suggestion to the first client device and an operation 610 of causing the first client device to present the first template suggestion in the first application on the first client device. The request processing unit 122 provides the first template suggestion to the native application 114 on the client device 105 or the web application 190 which is accessed via the browser application 112 on the client device 105. The request processing unit 122 providing the first template suggestion to the native application 114 or the web application 190 causes these applications to present the template suggestion on a user interface of the application in some implementations. The native application 114 or the web application 190 may then integrate the template subsection associated with the first template suggestion into the first content item to assist the user in creating the content item.

The process 600 includes an operation 612 of receiving a second request for a template suggestion for the first electronic content item, the second request including the identifier of the first application and second textual content from the first electronic content item, the second textual content being different than the first textual content. The second textual content represents at least a second subsection of the first electronic content item in some implementations.

The process 600 includes an operation 614 of constructing a second prompt for the first language model. The second prompt comprising a second natural language query that includes the identifier of the first application and the second textual content representing at least the second subsection of the first electronic content.

The process 600 includes an operation 616 of providing the second prompt to the first language model to obtain a second template suggestion. The second template suggestion includes a second template identifier of a second template and a first subsection of the second template predicted to be relevant for creating the first electronic content item based on the first application identifier and the second textual content. The second template is selected from among the plurality of templates and the first subsection of the second template being selected from among a plurality of subsections of the second templates. The second template may be the same as the first template or may be different template selected from among the templates in the template datastore 136. A technical benefit of the dynamic template generation techniques provided herein is that the user is not limited to a single static template and may be presented with template subsections from multiple templates to build a customized template that suits the user needs.

The process 600 includes an operation 618 of sending the second template suggestion to the first client device and an operation 620 of causing the first client device to present the second template suggestion in the first application on the first client device. The request processing unit 122 provides the second template suggestion to the native application 114 on the client device 105 or the web application 190 which is accessed via the browser application 112 on the client device 105. The request processing unit 122 providing the second template suggestion to the native application 114 or the web application 190 causes these applications to present the template suggestion on a user interface of the application in some implementations. The native application 114 or the web application 190 may then integrate the template subsection associated with the second template suggestion into the first content item to assist the user in creating the content item. A technical benefit of this approach is that the user receives a customized template created from template subsections from one or more templates rather than a static template that does not suit the specific needs of the user.

Figure 6B:
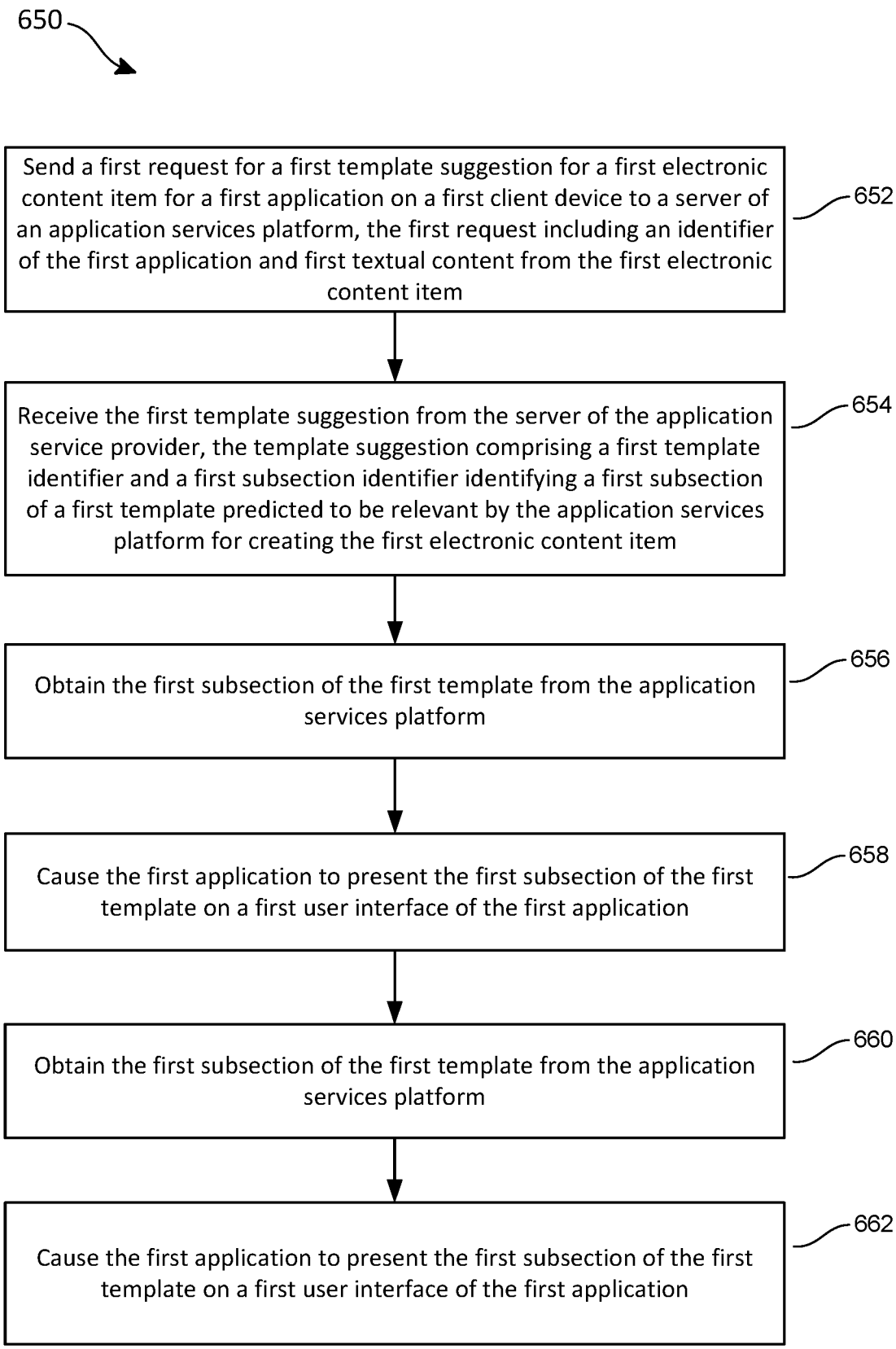
FIG. 6B is a flow chart of another example process for providing template component recommendations in an application according to the techniques disclosed herein.

FIG. 6B is a flow chart of another process 650 for providing template component recommendations in an application according to the techniques disclosed herein. The process 650 can be implemented by the client device 105 shown in the preceding examples.

The process 650 includes an operation 652 of sending a first request for a first template suggestion for a first electronic content item for a first application on a first client device to a server of an application services platform. The first request includes an identifier of the first application and first textual content from the first electronic content item. As discussed in the preceding examples, the native application 114 or the browser application 112 can send the request to the application services platform 110 for a template suggestion. The browser application 112 can send the request in implementation in which the user is accessing the web application 190 of the application services platform 110 to created or modify an electronic content item.

The process 650 includes an operation 654 of receiving the first template suggestion from the server of the application service platform 110. The template suggestion includes a first template identifier and a first subsection identifier identifying a first subsection of a first template predicted to be relevant by the application services platform 110 for creating the first electronic content item. In some implementations, the request processing unit 122 of the application services platform 110 sends the template suggestion to the client device 105. The template suggestion includes the template identifier of the template that the language model 138 predicted to be relevant and the subsection of that template that the language model 138 predicted to be most relevant to present to the user. The language model 138 determines the order that the subsections of the template are presented to the user rather than presenting a whole complex and extensive static template to the user.

The process 650 includes an operation 656 of obtaining the first subsection of the first template from the application services platform. The native application 114 or the browser application 112 can request the relevant subsection of the template from the application services platform 110, and the request processing unit 122 retrieves and sends the template subsection to the client device 105.

The process 650 includes an operation 658 of causing the first application to present the first subsection of the first template on a first user interface of the first application. The native application 114 or the web application 190 (via the browser application 112) display the subsection of the template in the first application to provide the user with an opportunity to consider whether to use the template.

The process 650 includes an operation 660 of receiving an indication via the first user interface indicating that the template suggestion has been accepted by a user of the first application. The user may accept the suggestion to utilize the subsection of the template as indicated in the preceding examples.

The process 650 includes an operation 662 of modifying the first electronic content item according to the first subsection of the first template. The native application 114 or the browser application 112 update the electronic content item according to the template subsection. The user may then utilize the template to complete at least a portion of the electronic content item in the application. The process of requesting and receiving template suggestions may proceed through additional iterations as the user continues create or modify the electronic content item. The application services platform 110 may suggest one or more additional template subsections from one or more templates from the template datastore 136. The language model 138 may suggest the template subsection in a different order than they appear in the source template from the template datastore 136. The order in which the template subsections is not fixed as it would be in a static template. A technical benefit of this approach is that relevant template subsections from more than one template may be suggested for authoring or modifying a particular electronic content item, which can improve the overall user experience and workflow.

Figure 6C:
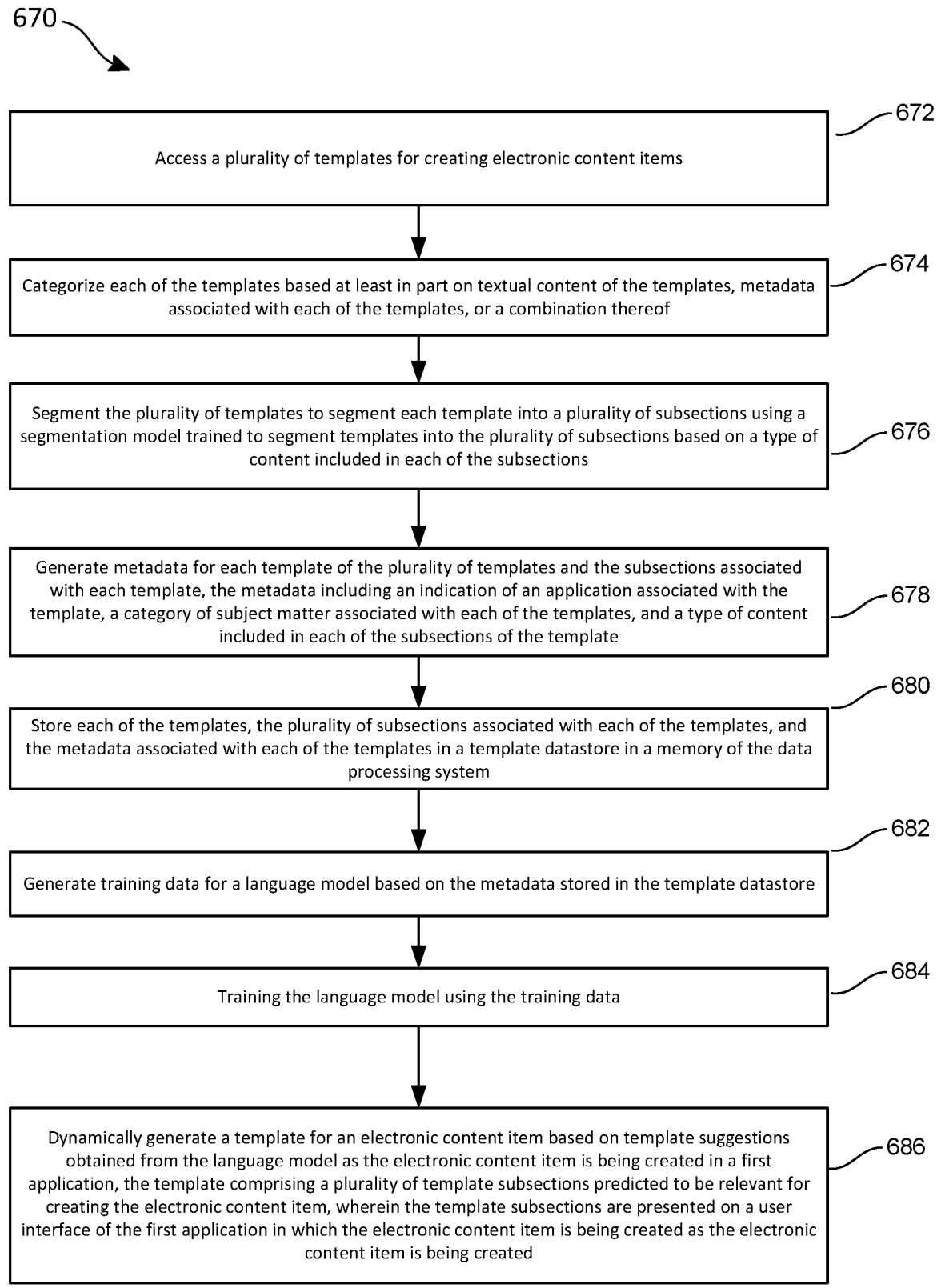
FIG. 6C is a flow chart of another example process for providing template component recommendations in an application according to the techniques disclosed herein.

FIG. 6C is a flow chart of an example process 670 for providing template component recommendations in an application according to the techniques disclosed herein. The process 670 can be implemented by the application services platform 110 shown in the preceding examples. The process 670 trains the language model and the utilizes the recommendations of a language model, such as the language model 138, to dynamically construct a template from a plurality of template subsections from one or more existing templates to provide a customized template for the user. Rather than selecting a static, page-level template before any content is added to the electronic content item, the process 670 enables the user to begin authoring the electronic content item and the application services platform 110 uses the language model to predict which template subsections would be useful to the user based on the current textual content of the electronic content item. This approach is an iterative process that creates a custom template that fits the user's needs for a particular electronic content item from the subsection of templates that are selected from among a set of available templates. In some implementations, the user can also choose to save the custom template layout so that the user can select that template again in the future.

The process 670 includes an operation 672 of accessing a plurality of templates for creating electronic content items. The source templates used to train the language model 138 may be provided by an administrator or other source as discussed in the preceding examples. The template processing unit 134 can access the source templates and process them so that the templates can be used to generate training data for the language model 138.

The process 670 includes an operation 674 of categorizing each of the templates based at least in part on textual content of the templates, metadata associated with each of the templates, or a combination thereof and an operation 676 of segmenting the plurality of templates to segment each template into a plurality of subsections using a segmentation model trained to segment templates into the plurality of subsections based on a type of content included in each of the subsections. As discussed in the preceding examples, the template processing unit 134 processes the source templates by categorizing the templates and segmenting the templates include a plurality of subsections. An example implementation of the template processing unit 134 is shown in FIG. 4 in which these operations are described in greater detail.

The process 670 includes an operation 678 of generating metadata for each template of the plurality of templates and the subsections associated with each template, the metadata including an indication of an application associated with the template, a category of subject matter associated with each of the templates, and a type of content included in each of the subsections of the template and an operation 680 of storing each of the templates, the plurality of subsections associated with each of the templates, and the metadata associated with each of the templates in a template datastore in a memory of the data processing system. In some implementations, the template processing unit 134 generates metadata for each of templates and stores this metadata in the template datastore 134 with the templates and template subsections. The metadata is used at least in part by the model training unit 132 to generate training data for the language model 138.

The process 670 includes an operation 682 of generating training data for a language model based on the metadata stored in the template datastore and an operation 684 of training the language model using the training data. The model training unit 132 generates the training data from the template information stored in the training datastore and uses this training data to train the language model 138.

The process 670 includes an operation 686 of dynamically generating a template for an electronic content item based on template suggestions obtained from the language model as the electronic content item is being created in a first application. The template includes a plurality of template subsections predicted to be relevant for creating the electronic content item. The template subsections are presented on a user interface of the first application in which the electronic content item is being created as the electronic content item is being created. The application services platform 110 utilizes the language model 138 to dynamically generate template suggestions for creating a custom template for the user from template subsections from one or more templates in the template datastore 136.

Figure 6D:
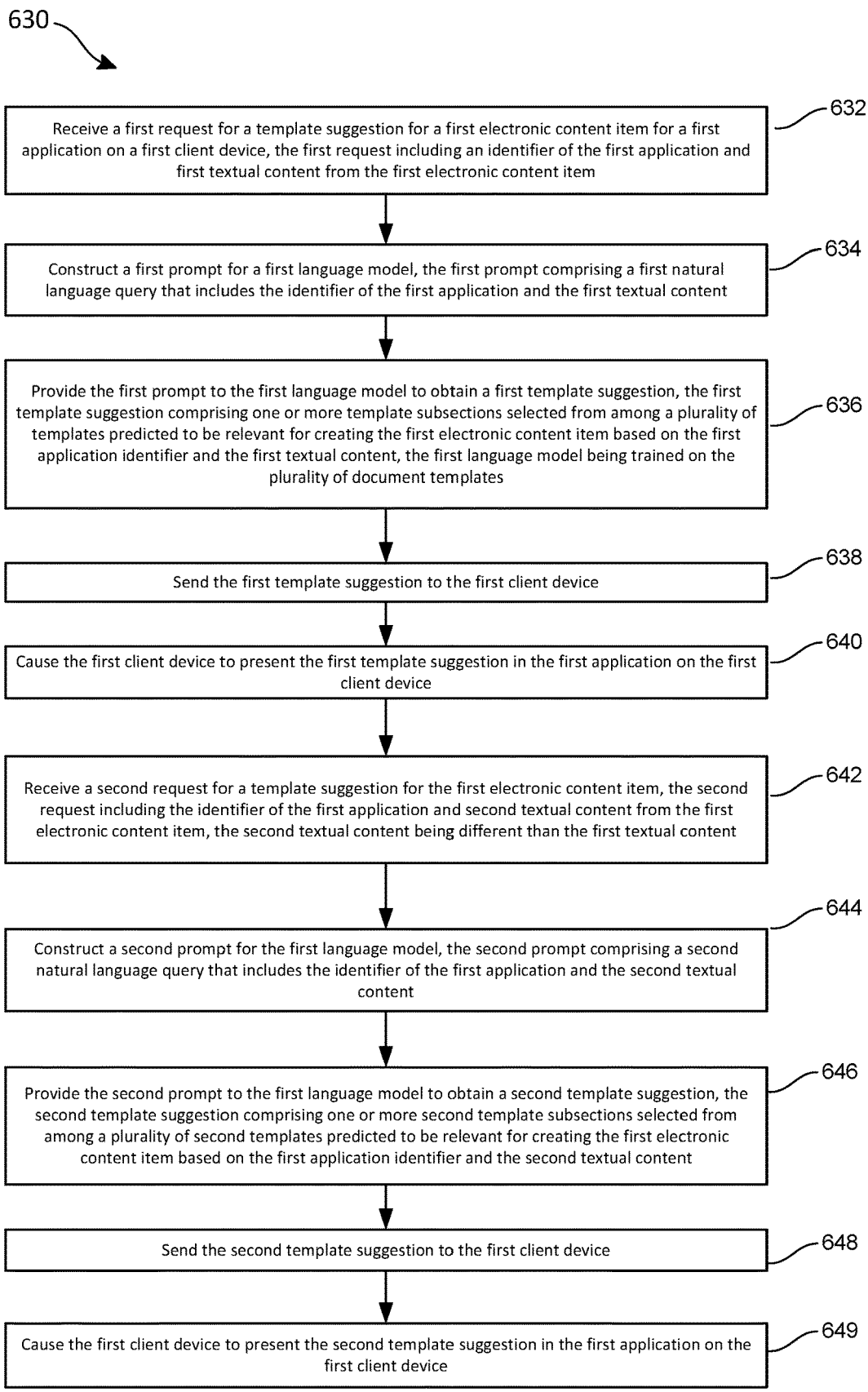
FIG. 6D is a flow chart of an example process for providing template component recommendations in an application according to the techniques disclosed herein.

FIG. 6D is a flow chart of an example process 630 for providing template component recommendations in an application according to the techniques disclosed herein. The process 630 can be implemented by the application services platform 110 shown in the preceding examples. The process 630 utilizes the recommendations of a language model, such as the language model 138, to dynamically construct a template from a plurality of template subsections from one or more existing templates to provide a customized template for the user. Rather than selecting a static, page-level template before any content is added to the electronic content item, the process 630 enables the user to begin authoring the electronic content item and the application services platform 110 uses the language model to predict which template subsections would be useful to the user based on the current textual content of the electronic content item. This approach is an iterative process that creates a custom template that fits the user's needs for a particular electronic content item from the subsection of templates that are selected from among a set of available templates. In some implementations, the user can also choose to save the custom template layout so that the user can select that template again in the future.

The process 630 includes an operation 632 of receiving a first request for a template suggestion for a first electronic content item for a first application on a first client device. The first request includes an identifier of the first application and first textual content from the first electronic content item. As discussed in the preceding examples, the native application 114 or the web application 190 can request a template suggestion to present to a user creating or modifying an electronic content item. This process can be triggered automatically as the user is creating or modifying an electronic content item or in response to a user input via the user interface of the native application 114 or the web application 190.

The process 630 includes an operation 634 of constructing a first prompt for a first language model. The first prompt comprising a first natural language query that includes the identifier of the first application and the first textual content. The first textual content may include a title and/or headers extracted from the electronic content item, a sentence or sentences of text from the electronic content item, a paragraph or paragraphs from the electronic content item, a section or sections of the electronic content item, and/or other portion of the text from the electronic content item. As discussed in the preceding examples, the prompt construction unit 124 of the application services platform 110 constructs a natural language query that is submitted to the language model.

The process 630 includes an operation 636 of providing the first prompt to the first language model to obtain a first template suggestion. The first template suggestion includes one or more template subsections selected from among a plurality of templates predicted to be relevant for creating the first electronic content item based on the first application identifier and the first textual content. The first template suggestion includes a template identifier for each template determined to be relevant and an indication of one or more subsections of the first template predicted to be relevant for creating the first electronic content item based on the first application identifier and the first textual content. The first language model has been trained on the plurality of document templates. The first language model may be implemented by the language model 138 discussed in the preceding examples. The template suggestion output by the model includes information identifying a template and subsection of that template from among the templates stored in the template datastore 126. This enables the request processing unit 122 to obtain the template subsection or subsections that have been predicted to be relevant and to provide that template subsection or subsections to the native application 114 or the web application 190.

The process 630 includes an operation 638 of sending the first template suggestion to the first client device and an operation 640 of causing the first client device to present the first template suggestion in the first application on the first client device. The request processing unit 122 provides the first template suggestion to the native application 114 on the client device 105 or the web application 190 which is accessed via the browser application 112 on the client device 105. The request processing unit 122 provides the first template suggestion to the native application 114 or the web application 190 causes these applications to present the template suggestion on a user interface of the application in some implementations. The native application 114 or the web application 190 may then integrate the template subsection associated with the first template suggestion into the first content item to assist the user in creating the content item. The native application 114 or the web application 190 presents the template subsection or subsections to the user in some implementations. The user may select from among the templates subsections presented or elect to not utilize the suggested template subsection or subsections.

The process 630 includes an operation 642 of receiving a second request for a template suggestion for the first electronic content item, the second request including the identifier of the first application and second textual content from the first electronic content item The second textual content is different than the first textual content. The second textual content may include a title and/or headers extracted from the electronic content item, a sentence or sentences of text from the electronic content item, a paragraph or paragraphs from the electronic content item, a section or sections of the electronic content item, and/or other portion of the text from the electronic content item.

The process 630 includes an operation 644 of constructing a second prompt for the first language model. The second prompt comprising a second natural language query that includes the identifier of the first application and the second textual content representing at least the second subsection of the first electronic content.

The process 630 includes an operation 646 of providing the second prompt to the first language model to obtain a second template suggestion, the second template suggestion comprising one or more second template subsections selected from among a plurality of second templates predicted to be relevant for creating the first electronic content item based on the first application identifier and the second textual content. The second template suggestion includes a template identifier for each template determined to be relevant and an indication of one or more subsections of the templates predicted to be relevant for creating the first electronic content item based on the first application identifier and the first textual content. The template subsections suggested in the second template suggestion may be different than the template subsections suggested in the first template suggestion. The second template subsections included in the second template subsection may be selected from among a different set of templates than were determined to be relevant in the first template suggestion. A technical benefit of the dynamic template generation techniques provided herein is that the user is not limited to a single static template and may be presented with template subsections from multiple templates to build a customized template that suits the user needs.

The process 630 includes an operation 648 of sending the second template suggestion to the first client device and an operation 649 of causing the first client device to present the second template suggestion in the first application on the first client device. The request processing unit 122 provides the second template suggestion to the native application 114 on the client device 105 or the web application 190 which is accessed via the browser application 112 on the client device 105. The request processing unit 122 providing the second template suggestion to the native application 114 or the web application 190 causes these applications to present the template suggestion on a user interface of the application in some implementations. The user may select from among the templates subsections presented or elect to not utilize the suggested template subsection or subsections. The native application 114 or the web application 190 may then integrate the selected template subsection associated with the second template suggestion into the first content item to assist the user in creating the content item. A technical benefit of this approach is that the user receives a customized template created from template subsections from one or more templates rather than a static template that does not suit the specific needs of the user.

The detailed examples of systems, devices, and techniques described in connection with FIGS. 1-6D are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6D are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
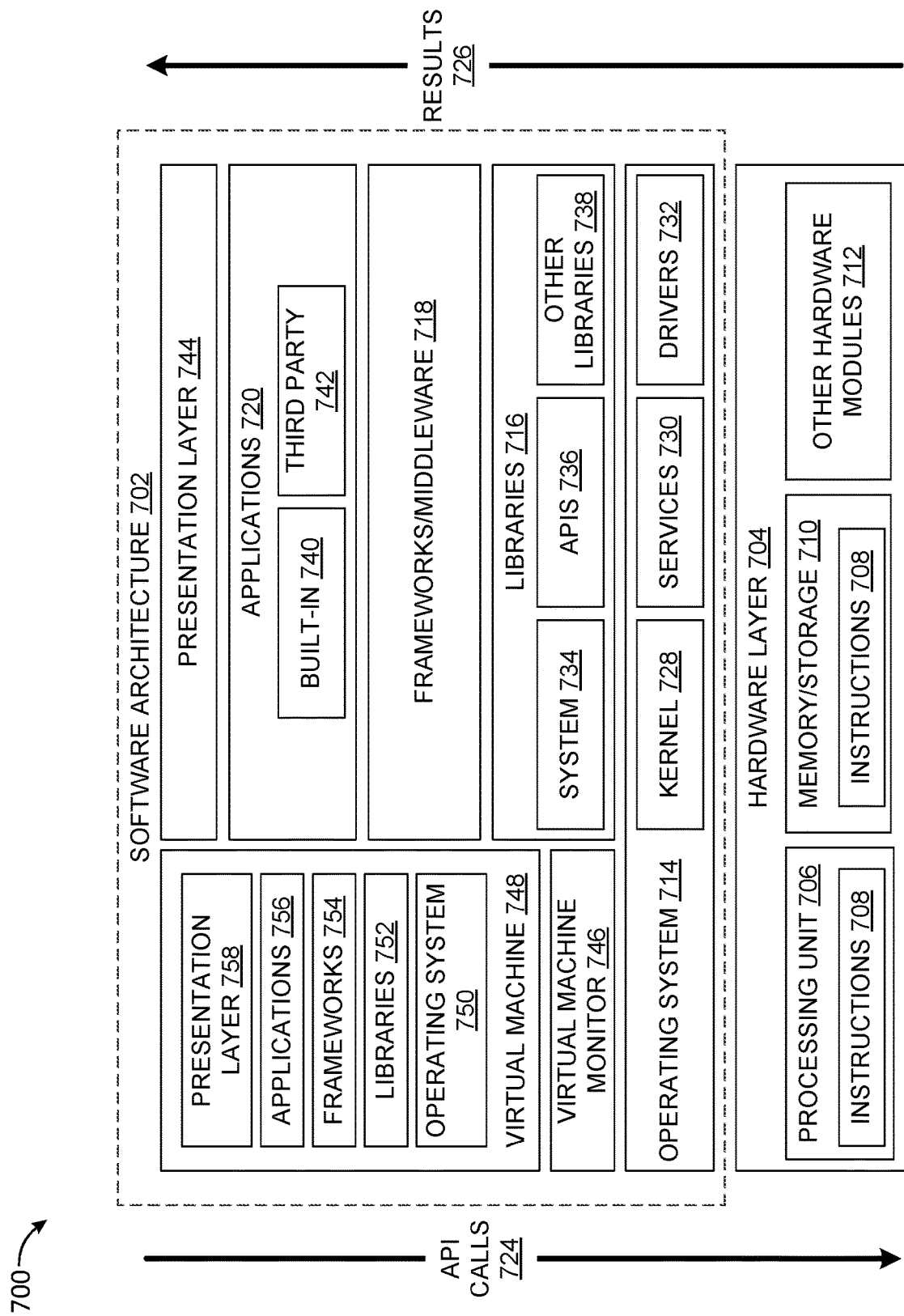
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
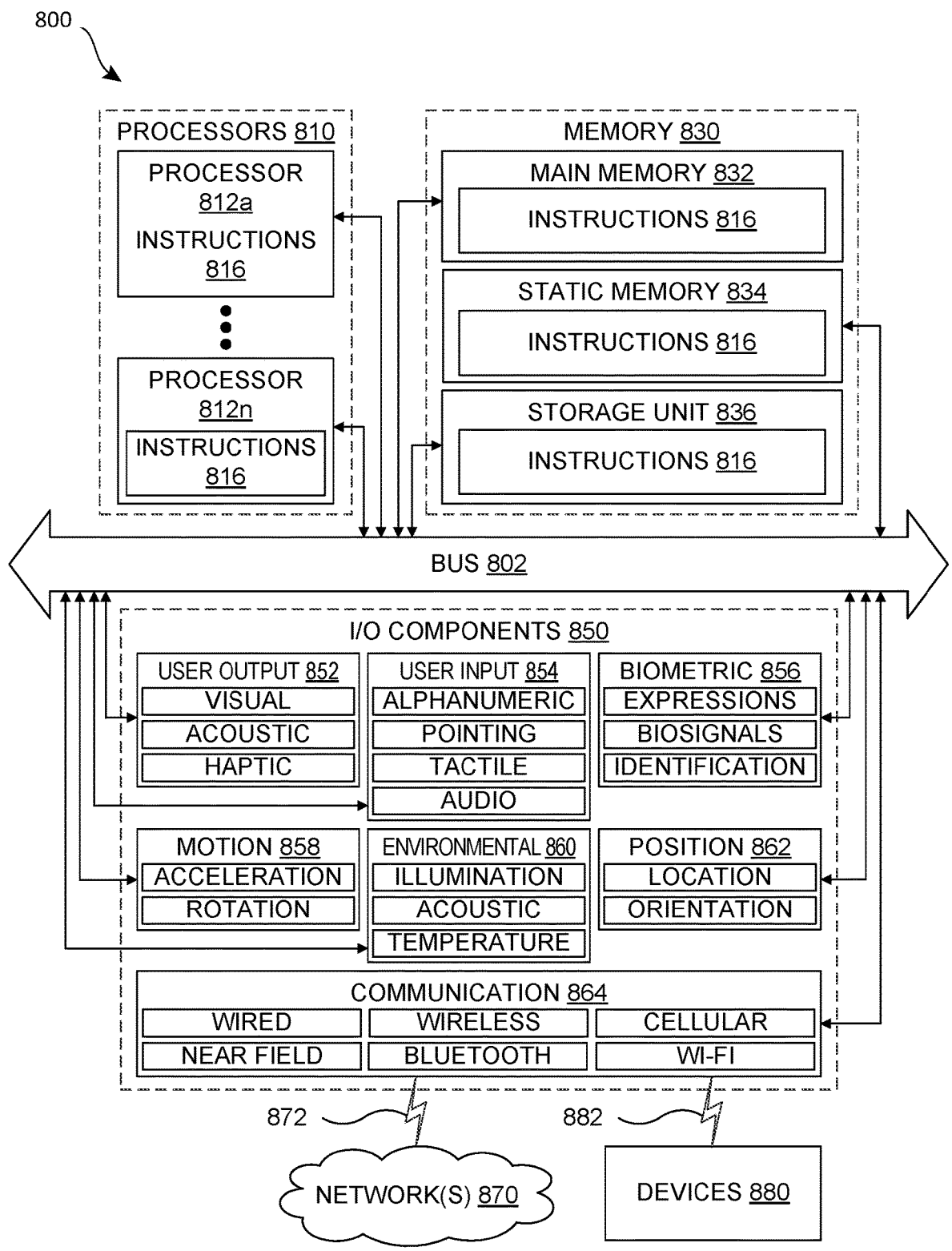
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable storage medium storing executable instructions that, when executed, cause the processor alone or in combination with other processors to perform operations of:
   receiving a first request for a template suggestion for a first electronic content item for a first application on a first client device, the first request including an identifier of the first application and first textual content from the first electronic content item;
   constructing a first prompt for a first language model, the first prompt comprising a first natural language query that includes the identifier of the first application and the first textual content;
   providing the first prompt to the first language model to obtain a first template suggestion, the first template suggestion comprising one or more first template subsections selected from among a plurality of document templates predicted to be relevant for creating the first electronic content item based on the identifier of the first application and the first textual content, the first language model being trained on the plurality of document templates;
   sending the first template suggestion to the first client device;
   causing the first client device to present the first template suggestion in the first application on the first client device;
   receiving a second request for a template suggestion for the first electronic content item, the second request including the identifier of the first application and second textual content from the first electronic content item, the second textual content being different than the first textual content;
   constructing a second prompt for the first language model, the second prompt comprising a second natural language query that includes the identifier of the first application and the second textual content;
   providing the second prompt to the first language model to obtain a second template suggestion, the second template suggestion comprising one or more second template subsections selected from among a plurality of second templates predicted to be relevant for creating the first electronic content item based on the identifier of the first application and the second textual content;
   sending the second template suggestion to the first client device; and
   causing the first client device to present the second template suggestion in the first application on the first client device.

2. The data processing system of claim 1, wherein the one or more first template subsections include at least one template subsection that is not including the one or more second template subsections.

3. The data processing system of claim 1, wherein the first language model is trained on metadata associated with the plurality of document templates and usage history associated with the plurality of document templates.

4. The data processing system of claim 1, wherein the first request includes context information associated with a first user, the context information includes one or more of usage pattern information indicating how the first user has used the first application, user role information indicative of a role of the first user within an organization, and metadata associated with one or more files previously created by the first user using the first application, and wherein providing the identifier of the first application and the first textual content to the first language model further comprising providing the context information as an additional input to the first language model.

5. The data processing system of claim 1, providing the identifier of the first application and the first textual content to the first language model further comprises constructing a textual prompt for the first language model that comprises the identifier of the first application and the first textual content.

6. The data processing system of claim 1, wherein the machine-readable storage medium further includes instructions configured to cause the processor alone or in combination with other processors to perform operations of:
   receiving feedback from a first user indicating whether the first template suggestion was useful; and
   refining outputs of the first language model based on the feedback received from the first user.

7. The data processing system of claim 1, wherein the machine-readable storage medium further includes instructions configured to cause the processor alone or in combination with other processors to perform operations of:
receiving a request to analyze a third template and an indication of a second application associated with the third template;
analyzing the third template using a categorization model trained to predict a first category of subject matter associated with the third template; and
associating the second application and the first category with the third template.

8. The data processing system of claim 7, wherein the machine-readable storage medium further includes instructions configured to cause the processor alone or in combination with other processors to perform operations of:
segmenting the third template into a plurality of segments using a segmentation model trained to segment templates into a plurality of subsections and to associate a content type indication with each of the plurality of subsections; and
storing the plurality of segments and the content type indication associated with each of the plurality of segments in a template datastore.

9. The data processing system of claim 8, wherein the machine-readable storage medium further includes instructions configured to cause the processor alone or in combination with other processors to perform operations of:
generating first training data for the first language model based on the indication of the second application, a category of subject matter associated with the third template, the plurality of segments of the third template, and the content type indication associated with each of the plurality of segments of the template datastore; and
training the first language model using the first training data.

10. The data processing system of claim 7, wherein the machine-readable storage medium further includes instructions configured to cause the processor alone or in combination with other processors to perform operations of:
analyzing the third template using a content moderation service to predict whether the third template includes objectionable subject matter; and
rejecting the third template responsive to predicting that the third template includes objectionable subject matter.

11. The data processing system of claim 1, wherein the machine-readable storage medium further includes instructions configured to cause the processor alone or in combination with other processors to perform operations of:
receiving a second request to refine the first template suggestion for the first electronic content item from the first client device, the second request comprising a natural language description requesting the first template suggestion be refined;
providing the natural language description to the first language model to obtain a second template suggestion for the first electronic content item;
sending the second template suggestion to the first client device; and
causing the first client device to present the first template suggestion in the first application on the first client device.

12. A method implemented in a data processing system for suggesting templates for generating electronic content, the method comprising:
receiving a first request for a template suggestion for a first electronic content item for a first application on a first client device, the first request including an identifier of the first application and first textual content from the first electronic content item, the first textual content representing at least a first subsection of the first electronic content item;
constructing a first prompt for a first language model, the first prompt comprising a first natural language query that includes the identifier of the first application and the first textual content;
providing the first prompt to the first language model to obtain a first template suggestion, the first template suggestion comprising a first template identifier of a first template and a first subsection of the first template predicted to be relevant for creating the first electronic content item based on the identifier of the first application and the first textual content, the first template being selected from among a plurality of templates and the first subsection of the first template being selected from among a plurality of subsections of the first template, the first language model being trained on the plurality of templates;
sending the first template suggestion to the first client device;
causing the first client device to present the first template suggestion in the first application on the first client device;
receiving a second request for a template suggestion for the first electronic content item, the second request including the identifier of the first application and second textual content from the first electronic content item, the second textual content being different than the first textual content, the second textual content representing at least a second subsection of the first electronic content item;
constructing a second prompt for the first language model, the second prompt comprising a second natural language query that includes the identifier of the first application and the second textual content representing at least the second subsection of the first electronic content item;
providing the second prompt to the first language model to obtain a second template suggestion, the second template suggestion comprising a second template identifier of a second template and a first subsection of the second template predicted to be relevant for creating the first electronic content item based on the identifier of the first application and the second textual content, the second template being selected from among the plurality of templates and the first subsection of the second template being selected from among a plurality of subsections of the second template;
sending the second template suggestion to the first client device; and
causing the first client device to present the second template suggestion in the first application on the first client device.

13. The method of claim 12, wherein the first template is different than the second template.

14. The method of claim 12, wherein the first language model is trained on metadata associated with the plurality of templates and usage history associated with the plurality of templates.

15. The method of claim 12, wherein the first request includes context information associated with a first user, the context information includes one or more of usage pattern information indicating how the first user has used the first application, user role information indicative of a role of the first user within an organization, and metadata associated with one or more files previously created by the first user using the first application, and wherein providing the identifier of the first application and the first textual content to the first language model further comprising providing the context information as an additional input to the first language model.

16. The method of claim 12, wherein providing the identifier of the first application and the first textual content to the first language model further comprises constructing a textual prompt for the first language model that comprises the identifier of the first application and the first textual content.

17. The method of claim 12, further comprising:
receiving feedback from a first user indicating whether the first template suggestion was useful; and
refining outputs of the first language model based on the feedback received from the first user.

18. The method of claim 12, further comprising:
receiving a request to analyze a third template and an indication of a second application associated with the third template;
analyzing the third template using a categorization model trained to predict a first category of subject matter associated with the third template; and
associating the second application and the first category with the third template.

19. A data processing system comprising:
a processor; and
a machine-readable storage medium storing executable instructions that, when executed, cause the processor alone or in combination with other processors to perform operations of:
accessing a plurality of templates for creating electronic content items;
categorizing each template of the plurality of templates based at least in part on textual content of each template the plurality of templates, metadata associated with each of the plurality of templates, or a combination thereof;
segmenting the plurality of templates to segment each template into a plurality of subsections using a segmentation model trained to segment templates into the plurality of subsections based on a type of content included in each subsection of the plurality of subsections;
generating metadata for each template of the plurality of templates and the plurality of subsections associated with each template, the metadata including an indication of an application associated with each template of the plurality of templates, a category of subject matter associated with each template of the plurality of templates, and a type of content included in each subsection of each template of the plurality of templates;
storing each of the templates, the plurality of subsections associated with each of the templates, and the metadata associated with each of the templates in a template datastore in a memory of the data processing system;
generating training data for a language model based on the metadata stored in the template datastore;
training the language model using the training data; and
dynamically generating a template for an electronic content item based on template suggestions obtained from the language model as the electronic content item is being created in a first application, the template comprising a plurality of template subsections predicted to be relevant for creating the electronic content item, wherein the plurality of template subsections are presented on a user interface of the first application in which the electronic content item is being created as the electronic content item is being created.

20. The data processing system of claim 19, wherein the machine-readable storage medium further includes instructions configured to cause the processor alone or in combination with other processors to perform operations of:
receiving an indication from the first application to save a copy of the template in the template datastore; and
storing template information in the template datastore that indicates which template subsections were included in the template and an order in which the plurality of template subsections were utilized in the template.

* * * * *